(12) United States Patent
Chen et al.

(10) Patent No.: US 8,164,038 B2
(45) Date of Patent: Apr. 24, 2012

(54) LIGHT SOURCE DIRECTION DETECTION DEVICE AND METHOD FOR DETECTING LIGHT SOURCE DIRECTION

(75) Inventors: Yarn-Chen Chen, Hsinchu (TW); Yi-Chieh Chang, Taichung (TW)

(73) Assignee: Sunplus mMedia Inc., Hsinchu (TW)

(*) Notice: Subject to any disclaimer, the term of this patent is extended or adjusted under 35 U.S.C. 154(b) by 400 days.

(21) Appl. No.: 12/436,128

(22) Filed: May 6, 2009

(65) Prior Publication Data
US 2010/0059658 A1 Mar. 11, 2010

(30) Foreign Application Priority Data
Sep. 10, 2008 (TW) ................................ 97134725 A

(51) Int. Cl.
*G01C 21/02* (2006.01)
(52) U.S. Cl. .................. 250/203.4; 250/206.1
(58) Field of Classification Search ............... 250/203.4, 250/206.1, 206.2; 454/75
See application file for complete search history.

(56) References Cited

U.S. PATENT DOCUMENTS

| | | | |
|---|---|---|---|
| 4,225,781 A * | 9/1980 | Hammons | 250/203.4 |
| 4,316,084 A | 2/1982 | Stout | |
| 4,484,565 A | 11/1984 | Mori | |
| 4,760,772 A * | 8/1988 | Horiguchi et al. | 454/75 |
| 4,769,531 A * | 9/1988 | Malek | 250/206.2 |
| 4,890,460 A * | 1/1990 | Takasi et al. | 62/180 |
| 5,056,421 A * | 10/1991 | Iida | 454/75 |
| 5,072,105 A * | 12/1991 | Osawa | 250/206.1 |
| 6,417,500 B1 | 7/2002 | Wood | |
| 7,115,850 B2 * | 10/2006 | Niemann et al. | 250/203.4 |

* cited by examiner

*Primary Examiner* — Thanh X Luu
(74) *Attorney, Agent, or Firm* — Jianq Chyun IP Office

(57) ABSTRACT

A light source detection device includes first photo sensors disposed on a reference plane along a first direction and a control unit. Each first photo sensor has a first sensing surface for detecting a photo intensity of a light source to output a photo intensity signal. The first sensing surfaces are back to back or face to face. An included angle between a normal vector of one of the first sensing surfaces and a normal vector of the reference plane is equal to an included angle between a normal vector of another one of the first sensing surfaces and the normal vector of the reference plane. The normal vectors are coplanar. The control unit is adapted to receive the photo intensity signals and normalize the difference of the photo intensities of the light source sensed by the first photo sensors, so as to detect a position of the light source.

12 Claims, 17 Drawing Sheets

LIGHT SOURCE DIRECTION DETECTION DEVICE AND METHOD FOR DETECTING LIGHT SOURCE DIRECTION

CROSS-REFERENCE TO RELATED APPLICATION

This application claims the priority benefit of Taiwan application serial no. 97134725, filed Sep. 10, 2008. The entirety of the above-mentioned patent application is hereby incorporated by reference herein and made a part of specification.

BACKGROUND OF THE INVENTION

1. Field of the Invention

The present invention generally relates to a light source detection device, in particular, to a light source detection device in a solar tracking system.

2. Description of Related Art

A light source detection module or a tracking module plays an important role in a solar tracking system. Generally speaking, recently, most conventional technologies are implemented by configuring photo sensors into a specifically-designed mechanism or casing, so as to detect a light source in a specific range of angles.

For example, in U.S. Pat. No. 4,484,565, a plurality of photo sensors is disposed in a designed casing, and the casing has a circular opening. As the photo sensors are disposed in the casing, a light source is irradiated on one of the light source detectors at a specific angle via the circular opening. Therefore, the angle of the light source may be derived.

Similarly, in U.S. Pat. Nos. 4,316,084 and 6,417,500, photo sensors are also disposed within a wrapped space, and the wrapped space is utilized to detect the angle of the light source, thereby achieving the purpose of detecting the light source.

SUMMARY OF THE INVENTION

Accordingly, the present invention is directed to a light source detection device, adapted to be disposed in an open space for detecting a position of a light source, which has a simple and accurate detection mechanism.

The present invention is further directed to a method for detecting a light source, which is suitable for effectively detecting a position of a light source.

As embodied and broadly described herein, the present invention provides a light source detection device, which is adapted to be disposed in an open space for detecting a position of a light source. The light source detection device includes two first photo sensors and a control unit. The first photo sensors are disposed on a reference plane along a first direction. Each of the first photo sensors has a first sensing surface for detecting the photo intensity of the light source and is adapted to output a photo intensity signal. The first sensing surfaces are disposed back to back or face to face. An included angle between a normal vector of one of the first sensing surfaces and a normal vector of the reference plane is equal to an included angle between a normal vector of the other one of the first sensing surfaces and the normal vector of the reference plane. The normal vectors are coplanar. The control unit is adapted to receive the photo intensity signals, and normalize a difference of the photo intensities of the light source sensed by the first photo sensors, so as to detect an angle of the light source relative to the reference plane along the first direction.

The present invention further provides a light source detection device, which is adapted to be disposed in an open space for detecting a position of a light source. The light source detection device includes a plurality of first photo sensors and a control unit. The first photo sensors are disposed in an array on a reference plane or a reference curved surface along a first direction. Each of the first photo sensors has a first sensing surface for detecting the photo intensity of the light source and is adapted to output a photo intensity signal. Included angles between normal vectors of any two adjacent first sensing surfaces are equal. The normal vectors are coplanar. The control unit is adapted to received the photo intensity signals, and normalize a difference of the photo intensities of the light source sensed by the first photo sensors, so as to directly detect an angle of the light source relative to the reference plane along the first direction.

In an embodiment of the present invention, the light source detection device further includes two second photo sensors disposed on a reference plane along a second direction. Each of the second photo sensors has a second sensing surface for detecting a photo intensity of the light source and is adapted to output a photo intensity signal. The second sensing surfaces are disposed back to back or face to face. An included angle between a normal vector of one of the second sensing surfaces and a normal vector of the reference plane is equal to an included angle between a normal vector of the other one of the second sensing surfaces and the normal vector of the reference plane. The normal vectors are coplanar.

In an embodiment of the present invention, the light source detection device further includes a plurality of second photo sensors disposed in an array on a reference plane or a reference curved surface along a second direction. Each of the second photo sensors has a second sensing surface for detecting a photo intensity of the light source and is adapted to output a photo intensity signal. Included angles between normal vectors of any two adjacent second sensing surfaces are equal. The normal vectors are coplanar.

The present invention provides a method for detecting a light source, which is suitable for detecting a position of a light source in an open space. The method includes the following steps. First, two first photo sensors are disposed on a reference plane along a first direction to form a sensing area, in which the sensing area is defined as a range of a difference of photo intensities of the light source simultaneously sensed by the first photo sensors after normalization. Each of the first photo sensors has a first sensing surface for detecting a photo intensity of the light source and is adapted to output a photo intensity signal. The first sensing surfaces are disposed back to back or face to face. An included angle between a normal vector of one of the first sensing surfaces and a normal vector of the reference plane is equal to an included angle between a normal vector of the other one of the first sensing surfaces and the normal vector of the reference plane, and the normal vectors are coplanar. Then, a difference of the photo intensities of the light source sensed by the first photo sensors is normalized. Thereafter, it is determined whether the normalized difference of the photo intensities falls within the sensing area or not, so as to directly detect an angle of the light source relative to the reference plane along the first direction.

The present invention provides a method for detecting a light source, which is suitable for detecting a position of a light source in an open space. The method includes the following steps. First, a plurality of first photo sensors is disposed on a reference plane or a reference curved surface along a first direction to form a sensing area, in which the sensing area is defined as a range of a difference of photo intensities of the light source simultaneously sensed by the first photo sensors after normalization. Each of the first photo sensors has a first sensing surface for detecting a photo intensity of the light source and is adapted to output a photo intensity signal. Included angles between normal vectors of any two adjacent first sensing surfaces are equal, and the normal vectors are coplanar. Then, it searches for a first photo sensor that outputs a maximum photo intensity signal, and a direction where the first sensing surface of the first photo sensor faces the light source serves as a light source direction. Thereafter, a difference of photo intensities sensed by two first photo sensors at two sides adjacent to the first photo sensor that outputs the maximum photo intensity are normalized, so as to correct the light source direction.

In the light source detection device according to an embodiment of the present invention, two first photo sensors are properly disposed on a reference plane or a reference curved surface, such that the position of the light source can be directly obtained after the light source detection device performs a normalization operation on a difference between photo intensities of the light source respectively sensed by the first photo sensors. Similarly, in the light source detection device, a plurality of first photo sensors may be properly disposed on a reference plane or a reference curved surface, the direction where the first photo sensor that senses the maximum photo intensity faces is defined as the light source direction, and then a normalization operation is performed according to the photo intensities sensed by two first photo sensors adjacent to the first photo sensor that senses the maximum photo intensity, so as to correct the light source direction. Furthermore, the present invention also provides a method for detecting a light source, which is applicable to the above light source detection devices.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
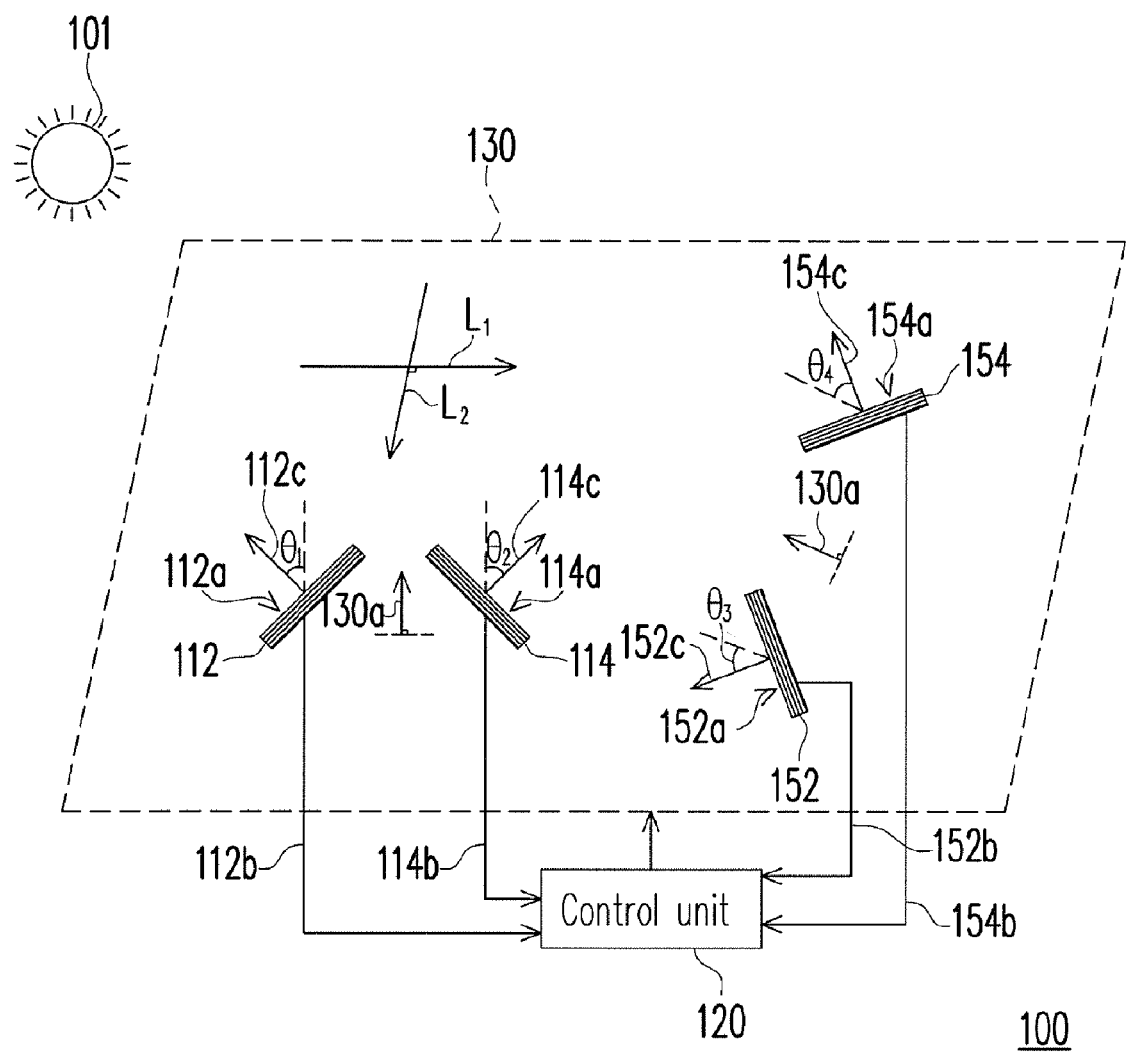
FIG. 1A is a schematic view of a light source detection device according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

[First Embodiment]

Figure 1B:
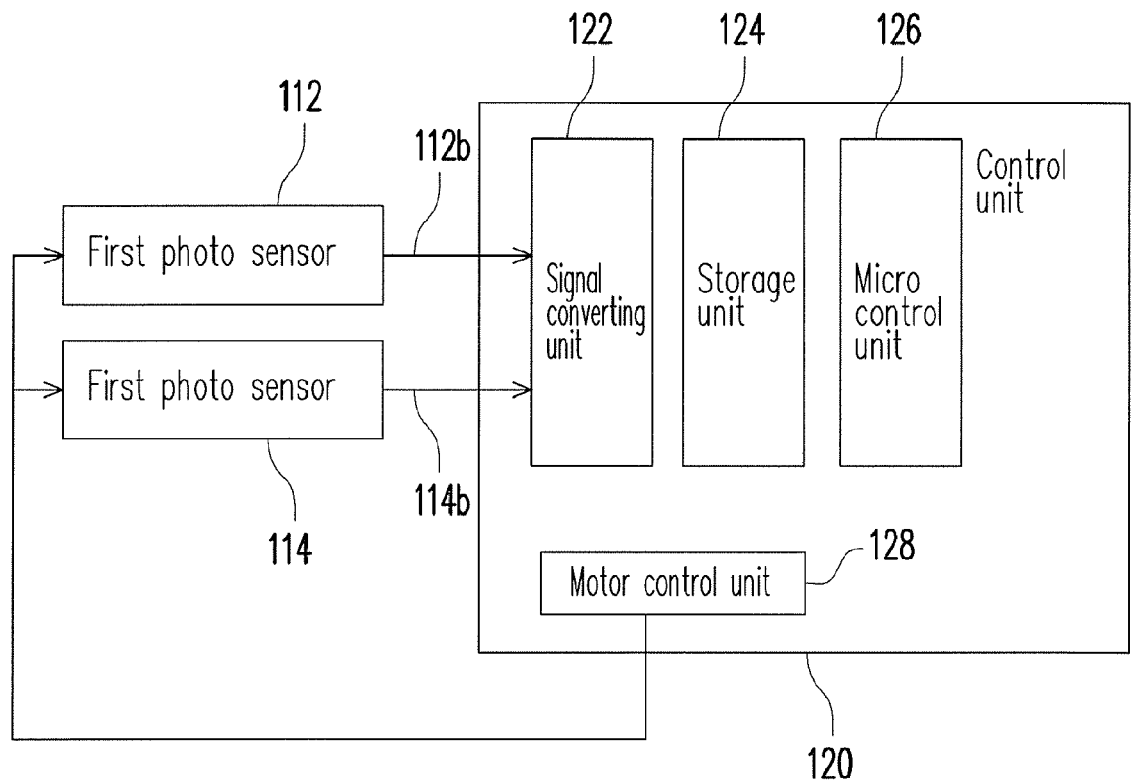
FIG. 1B is a schematic block diagram of the light source detection device according to the first embodiment of the present invention.

FIG. 1A is a schematic view of a light source detection device according to a first embodiment of the present invention, and FIG. 1B is a schematic block diagram of the light source detection device according to the first embodiment of the present invention. Referring to FIGS. 1A and 1B together, a light source detection device 100 of this embodiment is adapted to be disposed in an open space to detect a position of a light source 101. The light source detection device 100 includes two first photo sensors 112, 114 and a control unit 120.

In this embodiment, the first photo sensors 112 and 114 are disposed on a reference plane 130 along a first direction L1, as shown in FIG. 1A. In particular, each of the first photo sensors 112 and 114 has a first sensing surface 112a, 114a for detecting a photo intensity of the light source 101 and is adapted to output a photo intensity signal 112b, 114b respectively. The first sensing surface 112a and the first sensing surface 114a are disposed back to back or face to face, and in this embodiment, the first sensing surface 112a and the first sensing surface 114a are disposed back to back, as shown in FIG. 1A, which is only taken as an example, but not intended to limit the present invention.

In addition, an included angle $\theta_1$ between a normal vector 112c of the first sensing surface 112a and a normal vector 130a of the reference plane 130 is equal to an included angle $\theta_2$ between a normal vector 114c of the other first sensing surface 114a and the normal vector 130a of the reference plane 130, and the normal vectors 112c, 114c, and 130a are coplanar, i.e., $\theta_1=\theta_2$, as shown in FIG. 1A. In this embodiment, the included angle $\theta_1$, $\theta_2$ between the normal vector 112c, 114c of the first sensing surface 112a, 114a and the normal vector 130a of the reference plane 130 may be larger than 0 degrees and smaller than 90 degrees.

In this embodiment, the control unit 120 is adapted to receive the photo intensity signals 112b and 114b output from the first photo sensors 112 and 114, and normalize a difference between the photo intensities of the light source 101 respectively sensed by the first photo sensors 112 and 114, so as to directly detect an angle (not shown) of the light source 101 relative to the reference plane 130 along the first direction L1. That is to say, the position of the light source 101 relative to the reference plane 130 can be directly detected, as shown in FIGS. 1A and 1B. In particular, the control unit 120 includes a signal converting unit 122, a storage unit 124, and a micro control unit 126, as shown in FIG. 1B. The signal converting unit 122 is adapted to convert the photo intensity signals 112b and 114b of the first photo sensors 112 and 114 into digital signals. The storage unit 124 is adapted to store the digital signals of the photo intensity signals 112b and 114b, and data amount of the difference of the photo intensities of the light source 101 respectively sensed by the first photo sensors 112 and 114 after normalization. The micro control unit 126 is adapted to normalize a difference of the photo intensity signals 112b and 114b, so as to detect the angle of the light source 101 relative to the reference plane 130 along the first direction L1.

An actuation mechanism of the light source detection device 100 of the present invention is clearly illustrated below with reference to FIGS. 2A to 2C.

Figure 2A:
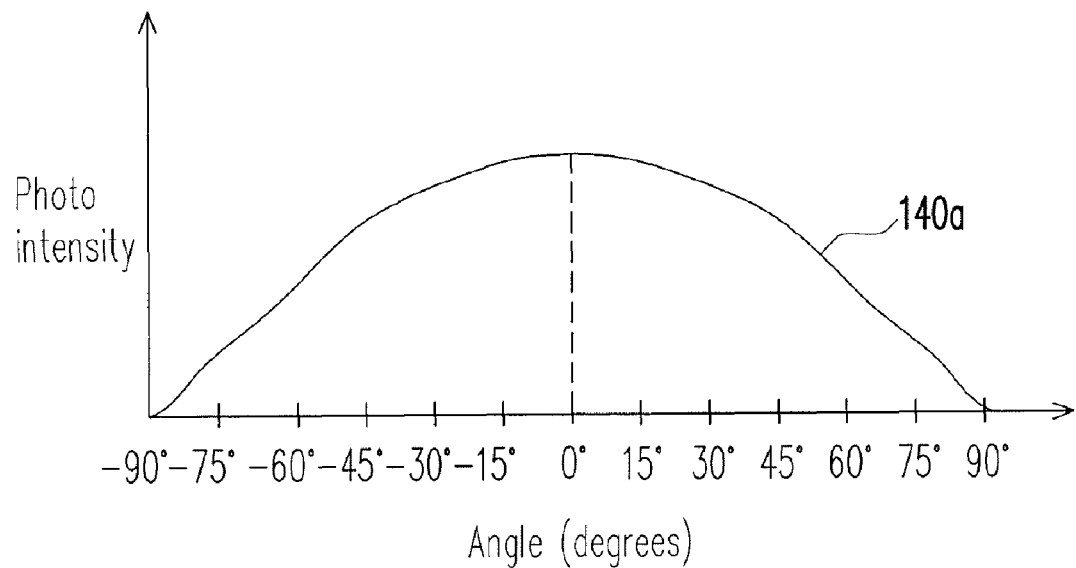
FIG. 2A shows a sensing spectrum of a light source sensed by a photo sensor.
Figure 2B:
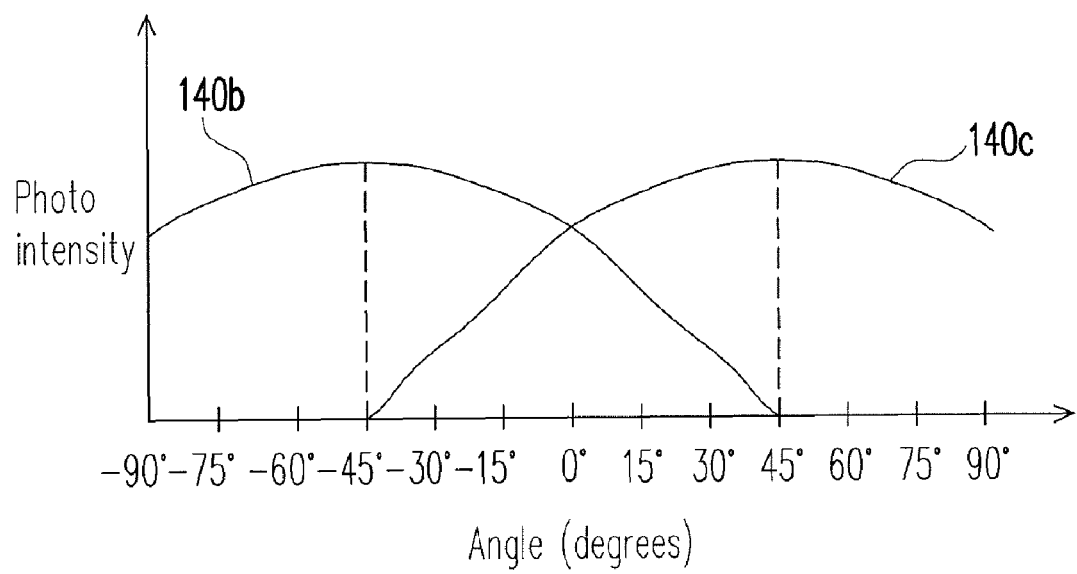
FIG. 2B shows sensing spectrums of the light source sensed by two first photo sensors shown in FIG. 1A disposed on a reference plane.

FIG. 2A shows a sensing spectrum of a light source sensed by a photo sensor, and FIG. 2B shows sensing spectrums of a light source sensed by two first photo sensors shown in FIG. 1A disposed on a reference plane, in which the transverse axis is defined as an angle of the light source relative to the reference plane, and the longitudinal axis is defined as a relative photo intensity of the light source sensed by the photo sensors. In addition, FIG. 2C shows a sensing spectrum obtained from the sensing curves shown in FIG. 2B after performing a normalization on a difference of photo intensities, in which the transverse axis is defined as an angle of the light source relative to the reference plane, and the longitudinal axis is defined as a relative value obtained after normalization.

Referring to FIG. 2A first, generally, when the light source faces the sensing surface of the photo sensor, and an angle as shown in FIG. 2A is 0 degrees, the photo intensity sensed by the photo sensor is at a maximum level. As the included angle between the light source and the normal vector of the photo sensor is increased (i.e., the light source gradually departs from the direction where it faces the photo sensor), the photo intensity of the light source sensed by the photo sensor is reduced, as shown by a curve 140a of FIG. 2A. Therefore, if the two first photo sensors 112 and 114 are disposed on the reference plane 130 in the manner as shown in FIG. 1A, the sensing spectrums as shown in FIG. 2B may be obtained.

In particular, referring to FIGS. 1A and 2B together, included angles between the normal vectors 112c and 114c of the first photo sensors 112 and 114 and the normal vector 130a of the reference plane 130 are respectively −45 degrees and +45 degrees, in which the positive or negative value of the included angles is respectively determined dependent upon the normal vector of the reference plane 130, that is, $\theta_1=-45$ degrees, and $\theta_2=45$ degrees. Therefore, the first photo sensor 112 is applicable to sense the maximum photo intensity at −45 degrees, and the first photo sensor 114 is applicable to sense the maximum photo intensity at 45 degrees, as shown in FIG. 2B. In other words, the relations between the photo intensities of the light source 101 sensed by the first photo sensors 112 and 114 and the angles of the light source 101 relative to the reference plane 130 along the first direction L1 are respectively shown as curves 140b and 140c of FIG. 2B. It can be seen from the curve 140b and the curve 140c that, when the included angle of the light source 101 relative to the normal vector 130a of the reference plane 130 is between −45 degrees and +45 degrees, the first photo sensor 112 and the other first photo sensor 114 can sense the photo intensity of the light source 101 simultaneously, and when the included angle of the light source 101 relative to the normal vector 130a of the reference plane 130 exceeds the range from −45 degrees to +45 degrees, only one first photo sensor 112 or 114 can sense the photo intensity of the light source 101.

Figure 2C:
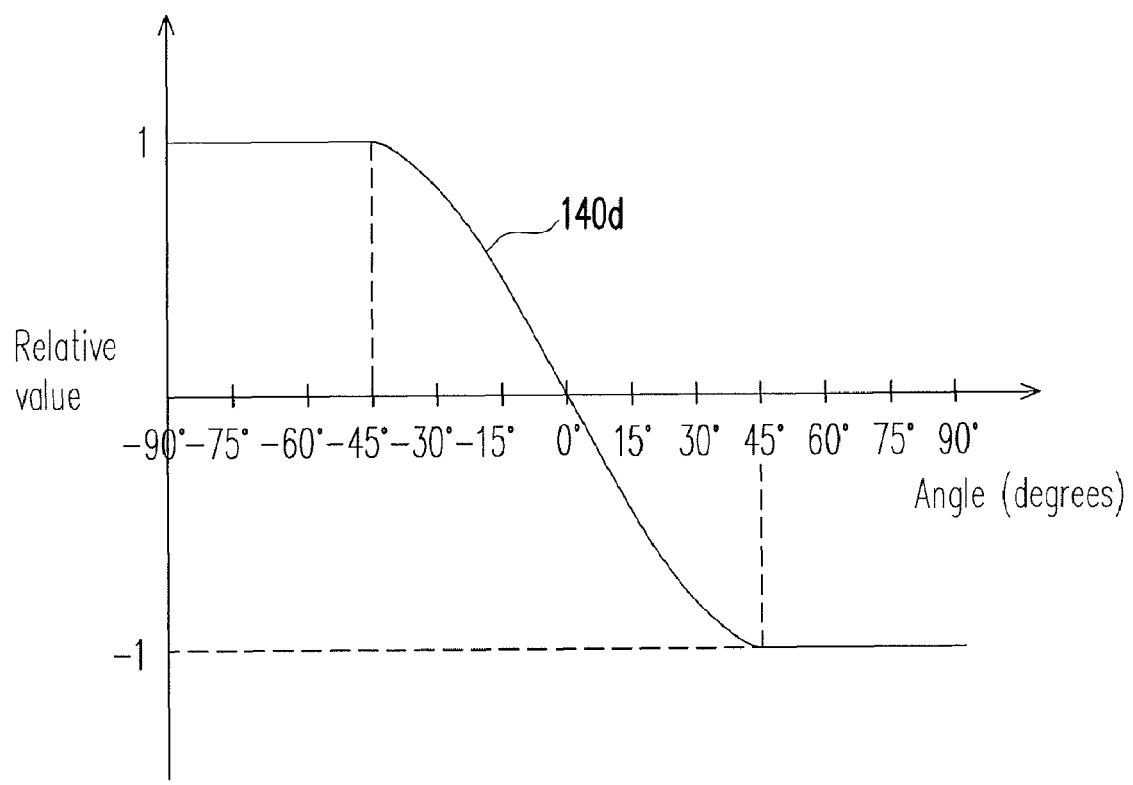
FIG. 2C shows a sensing spectrum obtained from the sensing curves shown in FIG. 2B after performing a normalization on a difference of photo intensities.

Particularly, the photo intensity sensed by the first photo sensor 114 is subtracted from the photo intensity sensed by the first photo sensor 112 to obtain a difference of photo intensities, and then the difference is divided by a sum of the photo intensities sensed by the two first photo sensors 112 and 114, thereby obtaining a curve 140d as shown in FIG. 2C and data in Table 1. In particular, it can be known from the curve 140d that, in the range from −45 degrees to +45 degrees, a single angle is corresponding to a single normalized difference of the photo intensities. Therefore, if the position of the light source 101 falls in the range from −45 degrees to +45 degrees, the above normalization of the difference of photo intensities may be performed on the photo intensities sensed by the first photo sensor 112 and the first photo sensor 114, so that the angle of the light source 101 relative to the reference plane 130 may be directly obtained through conversion together with the data in Table 1.

TABLE 1

| Normalized Difference of Photo Intensities | Angle of Light Source Relative to Reference Plane |
|---|---|
| 1 | −45 |
| 0.9 | −40 |
| 0.7 | −30 |
| 0.5 | −15 |
| 0 | 0 |
| −0.5 | 15 |
| −0.7 | 30 |
| −0.9 | 40 |
| −1 | 45 |

Definitely, a more accurate angle of the light source relative to the reference plane may be obtained based upon the curve 140d through an operation of approximation values, and Table 1 is only taken as an example.

In this embodiment, the included angles between the normal vectors 112c and 114c of the first photo sensors 112 and 114 and the normal vector 130a of the reference plane 130 are, for example, −45 degrees and +45 degrees respectively. In another embodiment, the included angles may be other proper degrees, which will be illustrated below.

Figure 2D:
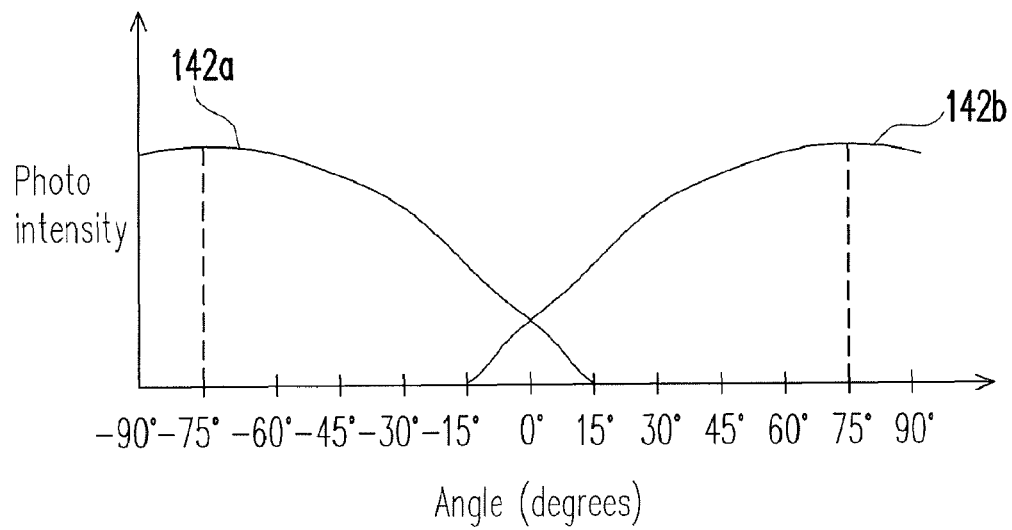
FIG. 2D shows sensing spectrums of the light source sensed by two first photo sensors disposed on the reference plane according to an embodiment.

In an embodiment, the included angles between the normal vectors 112c and 114c of the first photo sensors 112 and 114 and the normal vector 130a of the reference plane 130 are respectively −75 degrees and +75 degrees, that is, $\theta_1=-75$ degrees, and $\theta_2=75$ degrees. FIG. 2D shows sensing spectrums of a light source sensed by two first photo sensors disposed on the reference plane according to an embodiment, in which the transverse axis is defined as the angle of the light source relative to the reference plane, and the longitudinal axis is defined as the relative photo intensity of the light source sensed by the photo sensor. In addition, FIG. 2E shows a sensing spectrum obtained from the sensing curves shown in FIG. 2D after performing a normalization on a difference of photo intensities, in which the transverse axis is defined as the angle of the light source relative to the reference plane, and the transverse axis is defined as the normalized relative value.

In particular, referring to FIGS. 1A and 2D together, included angles between the normal vectors 112c and 114c of the first photo sensors 112 and 114 and the normal vector 130a of the reference plane 130 are respectively −75 degrees and +75 degrees, and thus the first photo sensor 112 is applicable to sense the maximum photo intensity at −75 degrees and the first photo sensor 114 is applicable to sense the maximum photo intensity at +75 degrees, as shown in FIG. 2D. Therefore, the relations between the photo intensities of the light source 101 sensed by the first photo sensors 112 and 114 and the angles of the light source 101 relative to the reference plane 130 are respectively shown as curves 142a and 142b in FIG. 2D. It can be seen from the curve 142a and the curve 142b that, when the included angle of the light source 101 relative to the normal vector 130a of the reference plane 130 falls between −15 degrees and +15 degrees, the first photo sensor 112 and the other first photo sensor 114 can sense the photo intensity of the light source 101 simultaneously, and when the included angle of the light source 101 relative to the normal vector 130a of the reference plane 130 exceeds the range from −15 degrees to +15 degrees, only one first photo sensor 112 or 114 can sense the photo intensity of the light source 101.

Figure 2E:
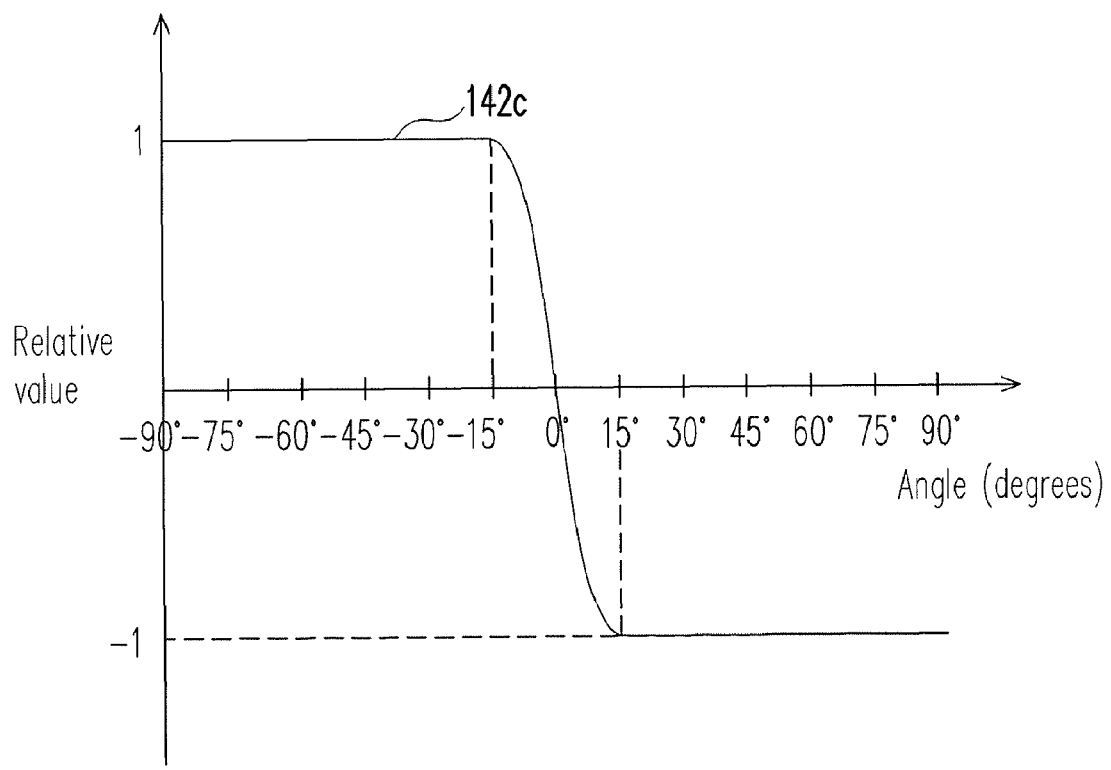
FIG. 2E shows a sensing spectrum obtained from the sensing curves shown in FIG. 2D after performing a normalization on a difference of photo intensities.

Similarly, the photo intensity sensed by the first photo sensor 114 is subtracted from the photo intensity sensed by the first photo sensor 112 to obtain a difference of photo intensities, and the difference is divided by a sum of the photo intensities sensed by the two first photo sensors 112 and 114, thereby obtaining a curve 142c as shown in FIG. 2E and data in Table 2. In particular, it can be known from the curve 142c that, in the range from −15 degrees to +15 degrees, a single angle is corresponding to a single normalized difference of photo intensities. Therefore, if the position of the light source falls in the range from −15 degrees to +15 degrees, the above normalization process may be performed on the photo intensities sensed by the first photo sensor 112 and the first photo sensor 114, and the angle of the light source relative to the reference plane may be directly obtained through conversion together with the data in Table 2.

TABLE 2

| Normalized Difference of Photo Intensities | Angle of Light Source Relative to Reference Plane |
|---|---|
| 1 | −15 |
| 0.9 | −14 |
| 0.7 | −10 |
| 0.5 | −5 |
| 0 | 0 |
| −0.5 | 5 |
| −0.7 | 10 |
| −0.9 | 14 |
| −1 | 15 |

Accordingly, when the included angles between the normal vectors 112c and 114c of the first photo sensors 112 and 114 and the normal vector 130a of the reference plane 130 is increased (such as the example of ±45 degrees to the example of ±75 degrees), the range capable of directly detecting the angle of the light source 101 relative to the reference plane 130 becomes smaller through adopting the above method of detecting the light source. However, the accuracy thereof becomes much higher. That is because the normalized difference of photo intensities still falls within the range of +1 to −1 although the detectable angle range of the light source becomes smaller, and thus the high accuracy in conversion may be obtained. In this embodiment, the included angles between the normal vectors 112c and 114c of the first photo sensors 112 and 114 and the normal vector 130a of the reference plane 130 are determined depending upon the requirements of the users, and the above illustrations are merely taken as examples, but not intended to limit the present invention.

In this embodiment, the control unit 120 further includes a motor control unit 128, as shown in FIG. 1B. The motor control unit 128 is adapted to control the reference plane 130 to rotate along the first direction L1. In particular, when the included angle of the light source 101 relative to the normal vector 130a of the reference plane 130 exceeds the above range capable of directly detecting the angle of the light source, the motor control unit 128 is adapted to control the reference plane 130 to rotate along the first direction L1, so as to enable the angle for detecting the light source 101 to fall within the range where the first photo sensors 112 and 114 can sense the photo intensity of the light source 101 simultaneously, thereby directly detecting the angle range of the light source 101 relative to the reference plane 130 through the above detecting method.

It should be noted that, merely the detection of the angle of the light source 101 moving along the first direction L1 is taken as an example in the above descriptions, that is, only the moving direction of the light source in one dimension is detected. In other words, in order to enable the light source detection device 100 to detect the moving direction or angle of the light source in another dimension, the light source detection device 100 is further provided with two second photo sensors 152 and 154.

In this embodiment, the second photo sensors 152 and 154 are disposed on a reference plane 130 along a second direction L2, as shown in FIG. 1A. In particular, each of the second photo sensors 152 and 154 has a second sensing surface 152a, 154a for detecting the photo intensity of the light source 101 and is adapted to output a photo intensity signal 152b, 154b respectively. The second sensing surface 152a and the second sensing surface 154a may be disposed back to back or face to face. In this embodiment, the first sensing surface 152a and the first sensing surface 154a are disposed back to back, as shown in FIG. 1A, which is taken as an example, but not intended to limit the present invention.

In particular, an included angle $\theta_3$ between a normal vector 152c of the second sensing surface 152a and a normal vector 130a of the reference plane 130 is equal to an included angle $\theta_4$ between a normal vector 154c of the second sensing surface 154a and the normal vector 130a of the reference plane 130, and the normal vectors 152c, 154c, and 130a are coplanar, that is, $\theta_3=\theta_4$, as shown in FIG. 1A. In this embodiment, the included angles $\theta_3$ and $\theta_4$ between the normal vectors 152c and 154c of the second sensing surfaces 152a and 154a and the normal vector 130a of the reference plane 130 are between 0 degrees and 90 degrees.

Likewise, the second photo sensors 152 and 154 are adapted to detect an angle of the light source 101 relative to the reference plane 130 along the second direction L2, and the related detecting method is similar to the above descriptions, which will not be repeated herein. Furthermore, in this embodiment, the second direction L2 is perpendicular to the first direction L1, and thus the light source detection device 100 can detect the moving direction or position of the light source 101 in two dimensions.

Figure 3:
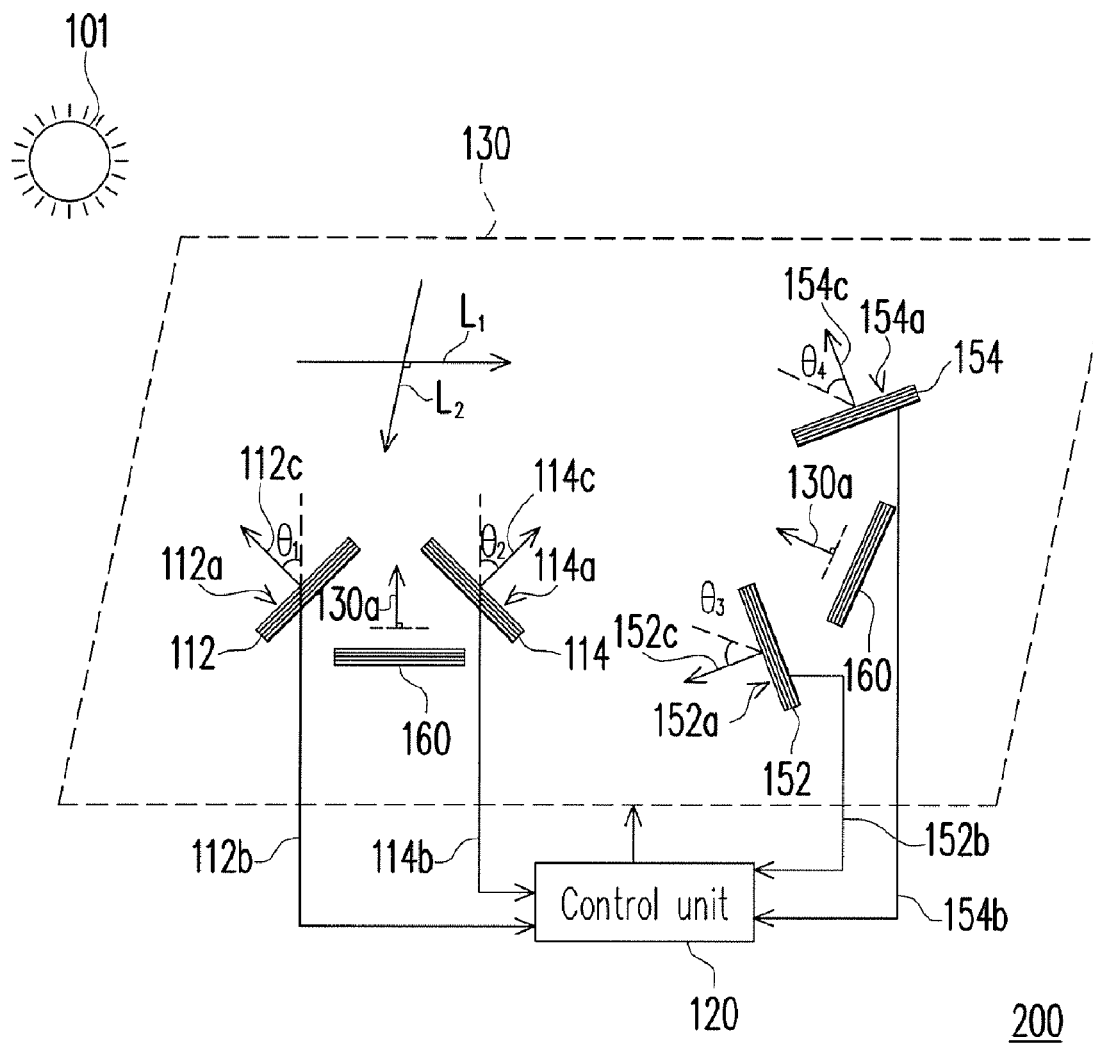
FIG. 3 is a schematic view of a light source detection device according to another embodiment of the present invention.

FIG. 3 is a schematic view of a light source detection device according to another embodiment of the present invention. Referring to FIGS. 1 and 3 together, a light source detection device 200 is similar to the light source detection device 100 in structure, and identical components are marked with identical reference numerals. The only difference therebetween lies in that, the light source detection device 200 further includes an intermediate photo sensor 160, as shown in FIG. 3.

In this embodiment, the intermediate photo sensor 160 may be disposed between the first photo sensors 112 and 114 and/or between the second photo sensors 152 and 154. The intermediate photo sensor 160 has an intermediate sensing surface 160a for detecting a photo intensity of the light source 101 and is adapted to output an intermediate photo intensity signal 160b. A normal vector 160c of the intermediate sensing surface 160a is in the same direction as the normal vector 130a of the reference plane 130.

The intermediate photo sensor 160 disposed between the first photo sensors 112 and 114 is taken as an example for illustration. The intermediate photo sensor 160 is mainly adapted to sense the photo intensity of the light source 101. The photo intensity sensed by the intermediate photo sensor 160 is used to normalize the difference of the photo intensities sensed by the first photo sensors 112 and 114. In the light source detection device 100, the sum of the photo intensities of the light source sensed by the first photo sensors 112 and 114 serves as the normalization condition.

Figure 4:
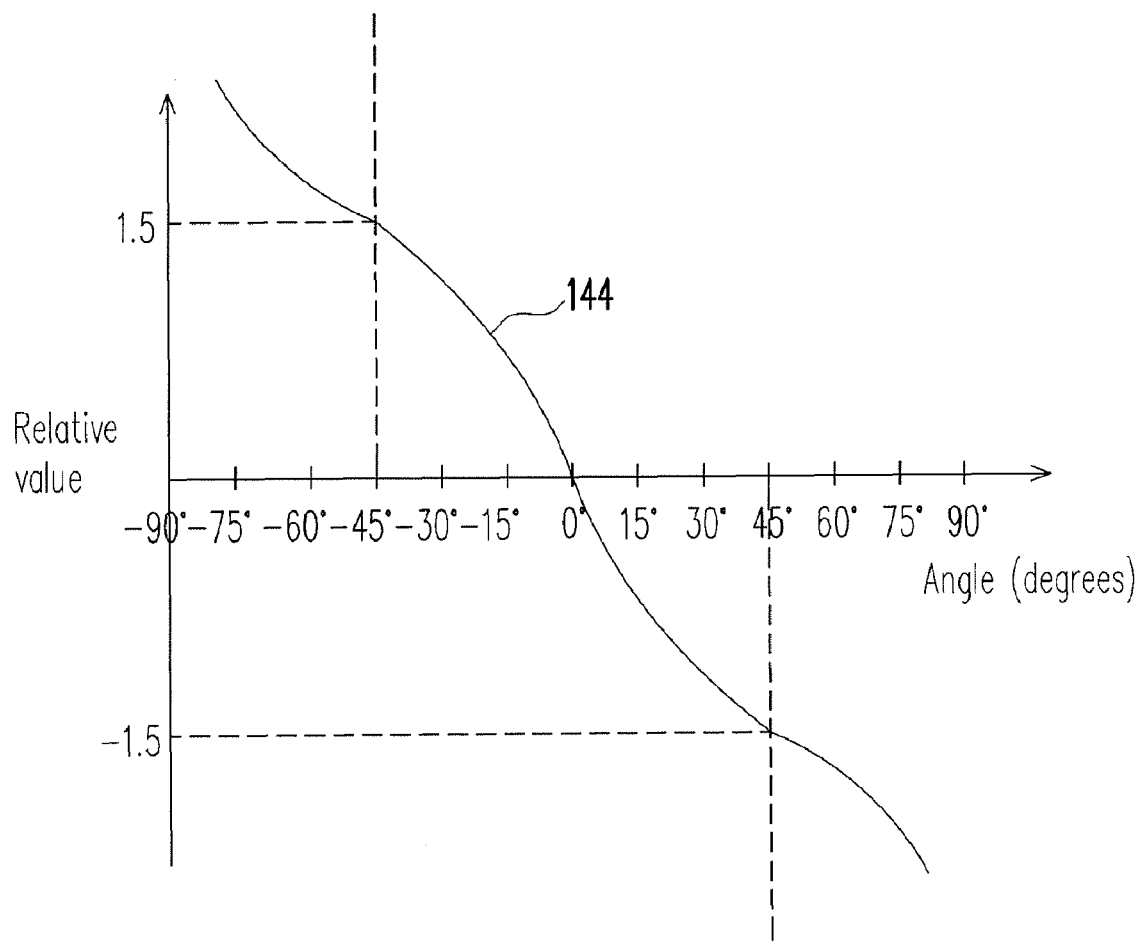
FIG. 4 shows a sensing spectrum obtained from the sensing curves shown in FIG. 2D after performing another normalization on the difference of photo intensities.

In this embodiment, the light source detection device 200 utilizes the photo intensity of the light source 101 sensed by the intermediate photo sensor 160 as the normalization condition. Therefore, the difference of the photo intensities of the light source 101 sensed by the first photo sensor 112 and 114 is divided by the photo intensity of the light source 101 sensed by the intermediate photo sensor 160, so that a normalized curve 144 as shown in FIG. 4 and data in Table 3 are obtained. The included angles between the normal vectors 112c and 114c of the first photo sensors 112 and 114 and the normal vector 130a of the reference plane 130 are respectively −45 degrees and +45 degrees, and the normal vector 160c of the intermediate sensing surface 160a is in the same direction as the normal vector 130a of the reference plane 130.

TABLE 3

| Normalized Difference of Photo Intensities | Angle of Light Source Relative to Reference Plane |
|---|---|
| 1.5 | −45 |
| 1.2 | −40 |
| 1.0 | −30 |
| 0.5 | −15 |
| 0 | 0 |
| −0.5 | 15 |
| −1.0 | 30 |
| −1.2 | 40 |
| −1.5 | 45 |

In FIG. 4, the curve 144 is a continuous smooth curve, and the range between −45 degrees and +45 degrees is similarly the range capable of directly detecting the angle of the light source. That is to say, when the angle of the light source falls in the range between −45 degrees and +45 degrees, the angle of the light source can be directly determined according to the obtained normalized difference of photo intensities, which is similar to the above mentioned principles and is not repeated herein. In this embodiment, when the angle of the light source relative to the reference plane falls between −45 degrees and +45 degrees, the normalized difference of photo intensities falls between 1.5 and −1.5. Therefore, under the same range capable of detecting the angle of the light source (for example, between −45 degrees and +45 degrees), the light source detection device 200 achieves a higher detection accuracy when detecting the position of the light source 101.

Similarly, as described in the above embodiment, the light source detection device 200 is also applicable to other angle ranges, and related illustrations will not be repeated herein.

In view of the above, in the light source detection devices 100 and 200, the first photo sensors 112 and 114 are disposed on the reference plane 130, a negative included angle and a positive included angle (e.g., −45 degrees and +45 degrees, or −75 degrees and +75 degrees) are respectively formed between the normal vectors 112c and 114c of the first photo sensors 112 and 114 and the normal vector 130a of the reference plane 130, and a range of angles where the first photo sensors 112 and 114 are capable of sensing the light source simultaneously is defined as the range for directly detecting the angle of the light source. Under different angles, a normalization operation is performed on the difference of the photo intensities of the light source sensed by the first photo sensors 112 and 114, thereby obtaining relations between the normalized values and the angles of the light source, as shown in FIGS. 2C, 2E, and 4, or Tables 1, 2, and 3. Therefore, when the first photo sensors 112, 114 detect the photo intensities of the light source, the normalized difference of the photo intensities may be calculated directly, thereby directly obtaining the position (or angle) of the light source 101 together with the data in Table 1, 2, or 3.

Figure 5:
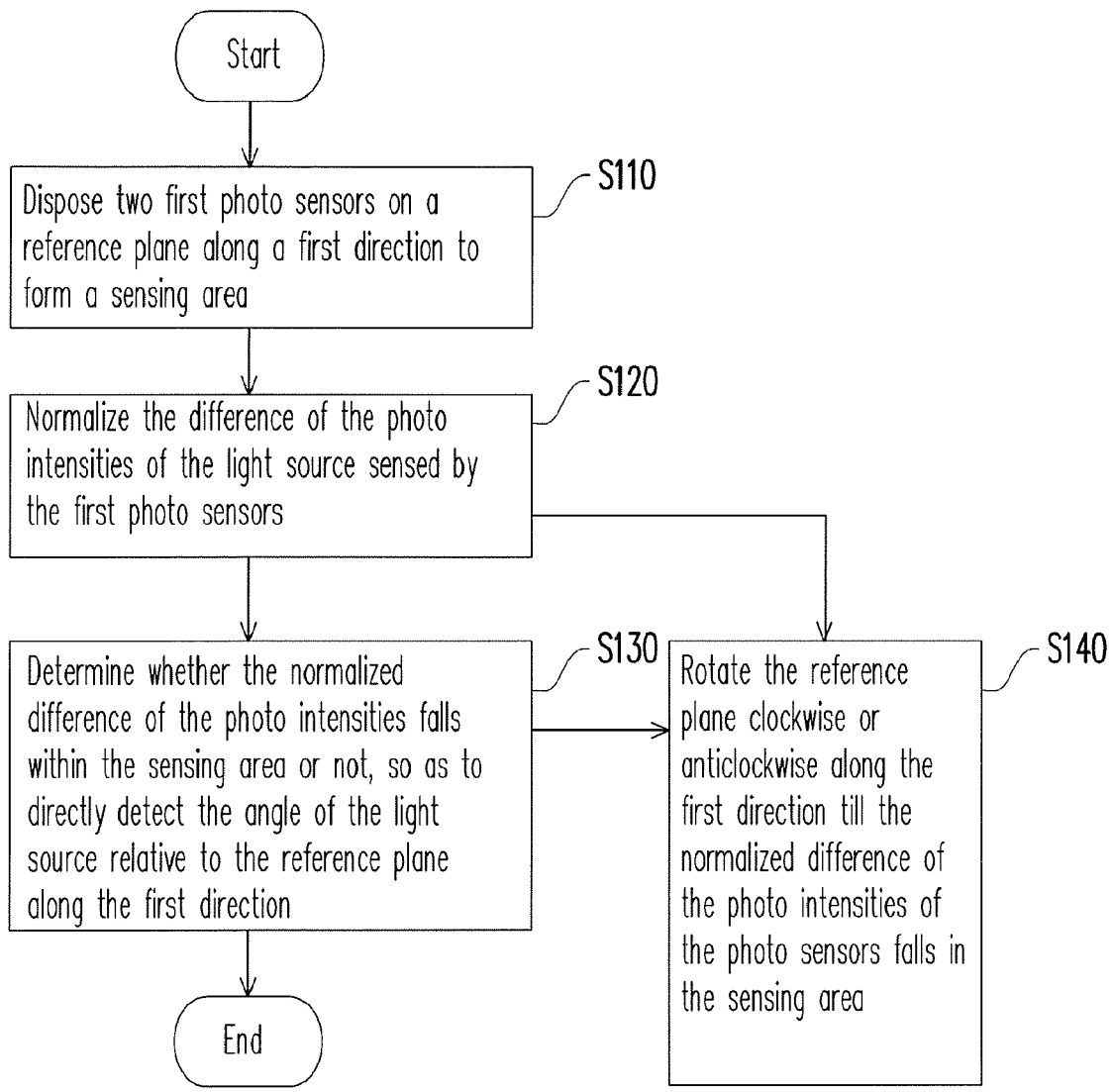
FIG. 5 is a flow chart block diagram of a method for detecting a light source according to an embodiment of the present invention.

In addition, FIG. 5 is a flow chart block diagram of a method for detecting a light source according to an embodiment of the present invention. Referring to FIG. 5, this embodiment is suitable for detecting a position of a light source in an open space.

First, in Step S110, two first photo sensors are disposed on a reference plane along a first direction to form a sensing area. The sensing area is defined as a range of a difference of photo intensities of the light source simultaneously sensed by the first photo sensors after normalization, for example, the range between −45 degrees and +45 degrees in the curve shown in FIG. 2C. In particular, each of the first photo sensors has a first sensing surface for detecting the photo intensity of the light source and is adapted to output a photo intensity signal, and the first sensing surfaces may be disposed back to back or face to face. In addition, an included angle between a normal vector of one of the first sensing surfaces and a normal vector of the reference plane is equal to an included angle between a normal vector of the other one of the first sensing surfaces and the normal vector of the reference plane, and the normal vectors are coplanar, as shown in FIG. 1A.

Then, in Step S120, the difference of the photo intensities of the light source sensed by the first photo sensors is normalized. In this embodiment, the process of normalizing the difference of the photo intensities of the light source sensed by the first photo sensors includes, for example, dividing the difference of the photo intensities of the light source sensed by the first photo sensors by a sum of the photo intensities of the light source sensed by the first photo sensors, and more detailed illustration may be obtained with reference to the descriptions of the above embodiments and thus will not be repeated herein.

Thereafter, in Step S130, it is determined whether the normalized difference of the photo intensities falls within the sensing area or not, so as to directly detect the angle of the light source relative to the reference plane along the first direction. In this embodiment, when the normalized difference of the photo intensities exceeds the sensing area, the reference plane is rotated clockwise or anticlockwise along the first direction till the normalized difference of the photo intensities of the photo sensors falls in the sensing area, as shown in Step S140. In particular, when the two first photo sensors are used to sense the light source, a difference of photo intensities is obtained by subtracting the photo intensity sensed by one of the first photo sensors from the photo intensity sensed by the other one, and the difference is then divided by a sum of the photo intensities sensed by the two first photo sensors, that is, the normalization operation is performed. After that, a table (for example, Table 1, 2, or 3) is looked up according to the value obtained after the normalization, so as to determine the angle of the light source relative to the reference plane, and relative descriptions may be obtained with reference to the above embodiment. If the value obtained after the normalization does not fall within the range specified in Table 1, 2, or 3, the reference plane is rotated clockwise or anticlockwise along the first direction till the value obtained after performing the normalization on the photo intensities sensed by the two first photo sensors falls within the above range (or within the sensing area). Therefore, a method for detecting a light source is achieved, and the method is applicable to the light source detection device 100.

In another embodiment, the process of normalizing the difference of photo intensities may also include disposing an intermediate photo sensor between the first photo sensors, in which the intermediate photo sensor has an intermediate sensing surface for detecting the photo intensity of the light source and is adapted to output an intermediate photo intensity signal, and a normal vector of the intermediate sensing surface is in the same direction as the normal vector of the reference plane.

The process of normalizing the difference of the photo intensities of the light source sensed by the first photo sensors includes, for example, dividing the difference of the photo intensities of the light source sensed by the first photo sensors by the photo intensity of the light source sensed by the intermediate photo sensor. Then, the principle for detecting the light source is identical to the descriptions of the light source detection device 200, and thus will not be repeated herein.

[Second Embodiment]

Figure 6A:
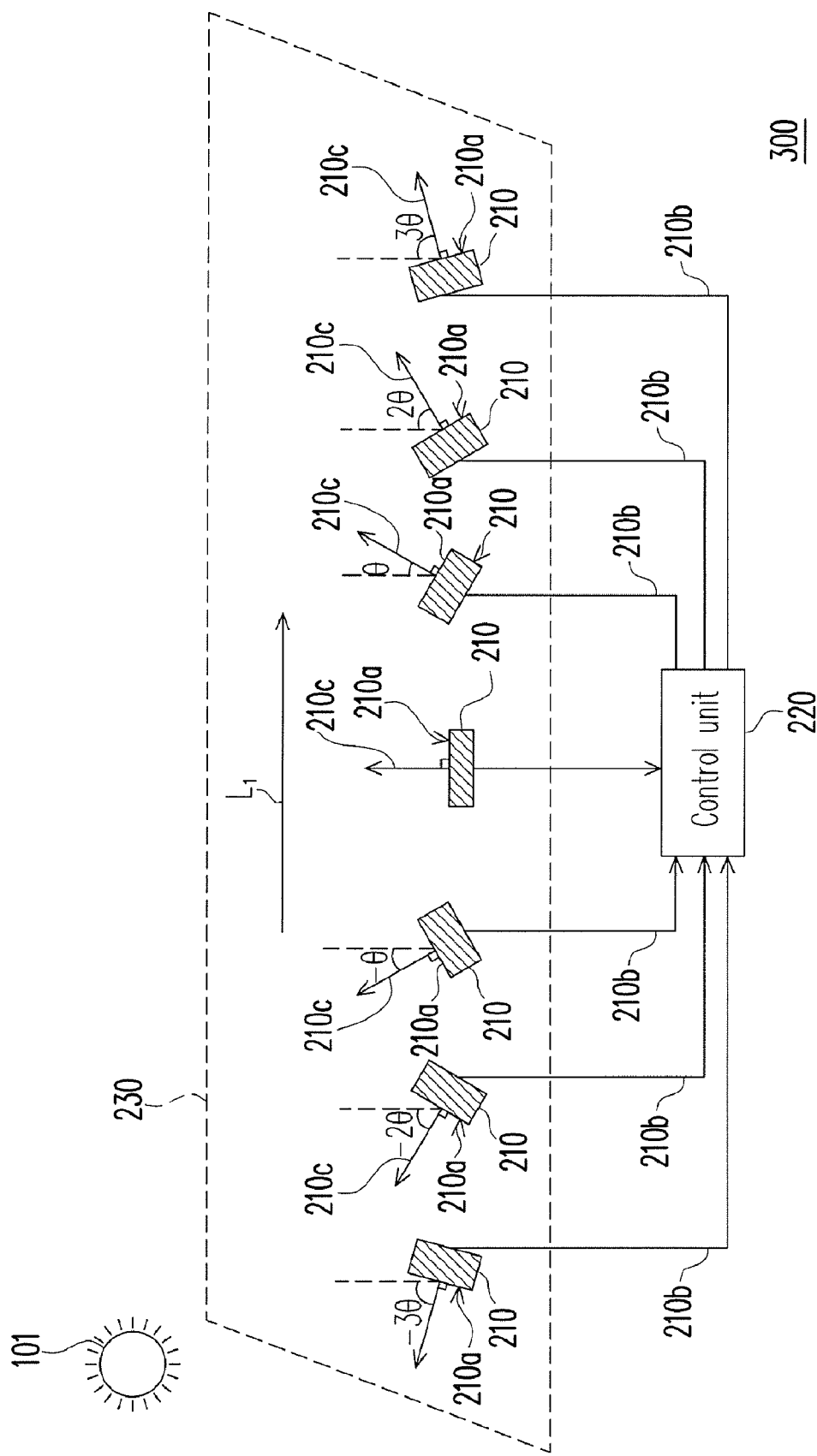
FIG. 6A is a schematic view of a light source detection device according to a second embodiment of the present invention.
Figure 6B:
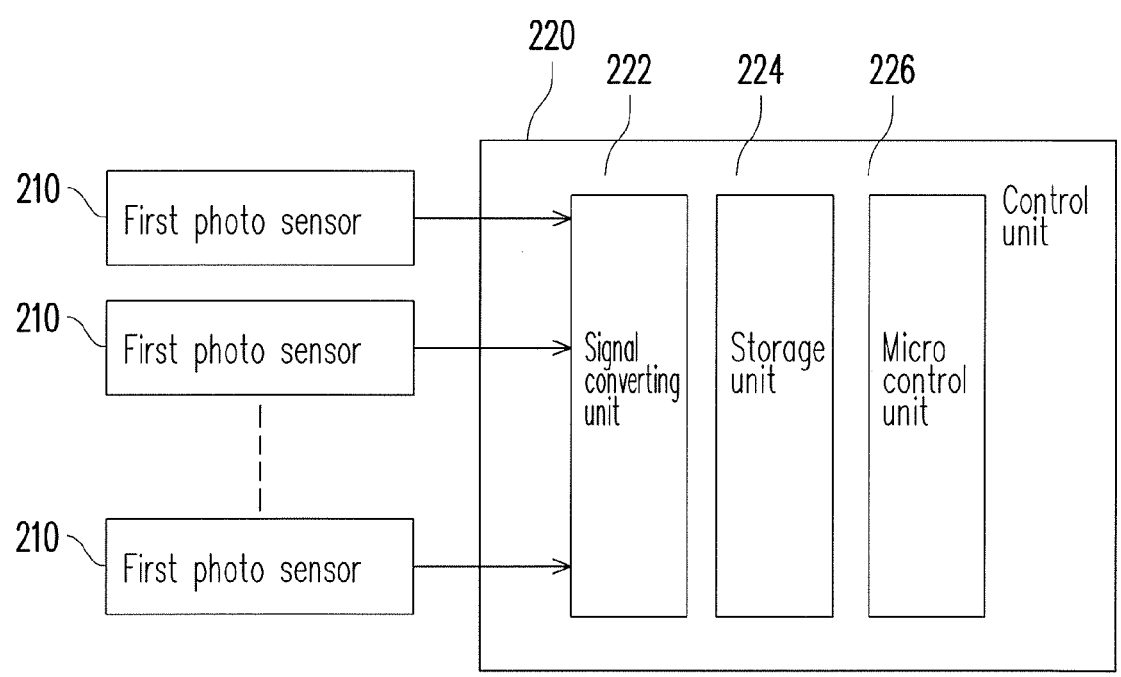
FIG. 6B is a schematic block diagram of the light source detection device according to the second embodiment of the present invention.

FIG. 6A is a schematic view of a light source detection device according to a second embodiment of the present invention, and FIG. 6B is a schematic block diagram of the light source detection device according to the second embodiment of the present invention. Referring to FIGS. 6A and 6B together, a light source detection device 300 of this embodiment is adapted to be disposed in an open space to detect a position of a light source 101. The light source detection device 300 includes a plurality of first photo sensors 210 and a control unit 220.

In this embodiment, the plurality of first photo sensors 210 is disposed in an array on a reference plane 230 along a first direction L1. Each of the first photo sensors 210 has a first sensing surface 210a for detecting a photo intensity of the light source 101 and is adapted to output a photo intensity signal 210b. Included angles between normal vectors 210c of any two adjacent first sensing surfaces 210a are equal, for example, an angle θ in FIG. 6A, and the normal vectors 210c are coplanar, as shown in FIG. 6A. In this embodiment, 7 first photo sensors 210 are disposed in an array on the reference plane 230 along the first direction L1, and in another embodiment, the first photo sensors 210 in a different number may be configured. It should be noted that, more first photo sensors 210 may produce a higher accuracy of the light source detection device 300. However, considering design factors of the users and the manufacturing cost, the present invention is not limited thereto, and the above description is only taken as an example. Furthermore, the range of the photo intensities of the light source 101 sensed by the first sensing surface 210a along the first direction L1 falls between 0 degrees and 180 degrees, and the included angle θ between the normal vectors of any two adjacent first sensing surfaces 210a is larger than 0 degrees and smaller than 90 degrees, as shown in FIG. 6A.

In particular, the plurality of first photo sensors 210 is disposed on the reference plane 230 along the first direction L1, and each of the sensing surfaces 210a faces a different angle along the first direction L1, as shown in FIG. 6A. Therefore, when sensing the light source 101, one of the first photo sensors 210 may sense the maximum photo intensity of the light source 101. In such a manner, the angle where the first sensor 210 that senses the maximum photo intensity faces is defined as the angle of the light source relative to the reference plane 230 along the first direction L1 currently, and the process of normalizing the photo intensities as mentioned above is performed on the photo intensities sensed by two first photo sensors 210 adjacent to the first sensor 210 that senses the maximum photo intensity, so as to correct the angle of the light source 101 relative to the reference plane 230 along the first direction L1.

In other words, in the light source detection device 300 of this embodiment, the direction of the light source 101 may be directly sensed through the photo intensities sensed by the plurality of first photo sensors without rotating the reference plane 230, and the angle of the light source 101 relative to the reference plane 230 along the first direction L1 may be sensed more accurately through the process of normalizing the photo intensities as mentioned above.

In this embodiment, the control unit 220 is adapted to receive the photo intensity signals 210b of the first photo sensors, and normalize the difference of the photo intensities of the light source 101 sensed by the first photo sensors 210, so as to directly detect the angle of the light source 101 relative to the reference plane 230 along the first direction L1, as shown in FIG. 6B. In particular, the control unit 220 includes a signal converting unit 222, a storage unit 224, and a micro control unit 226, as shown in FIG. 6B. The signal converting unit 222 is adapted to convert the photo intensity signals 210b of the first photo sensors 210 into digital signals. The storage unit 224 is adapted to store digital signals of the photo intensity signals 210b, and data amount of the normalized difference of the photo intensities of the light source 101 sensed by the first photo sensors 210. The micro control unit 220 is adapted to normalize a difference of the photo intensity signals 210b, so as to detect the angle of the light source 101 relative to the reference plane 230 along the first direction L1.

An actuation mechanism of the light source detection device 300 of the present invention is described below in detail with reference to FIGS. 7A to 7C.

Figure 7A:
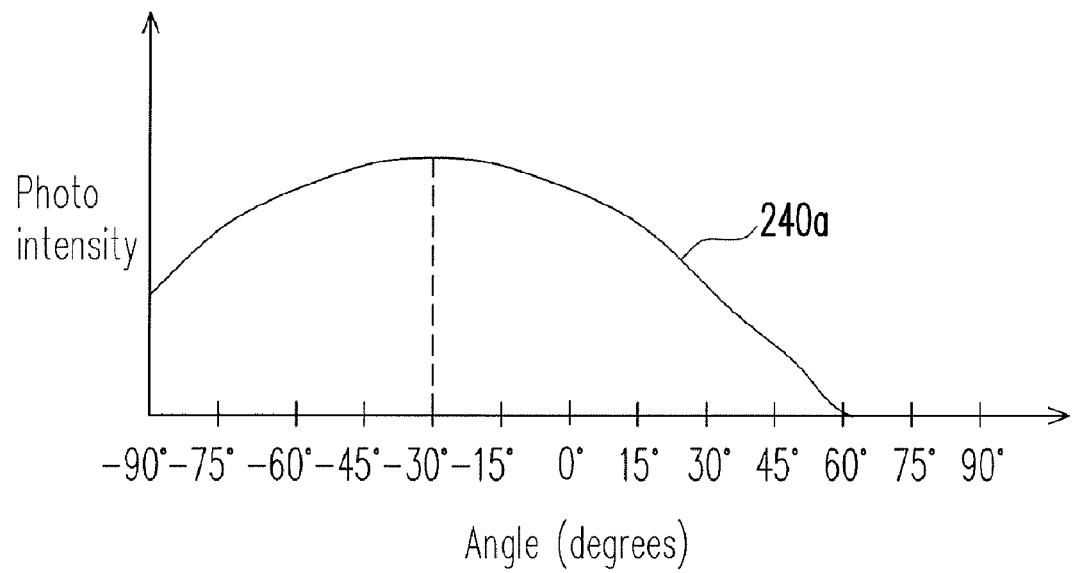
FIG. 7A shows a sensing spectrum of the light source sensed by one of the first photo sensors that senses the maximum photo intensity.
Figure 7B:
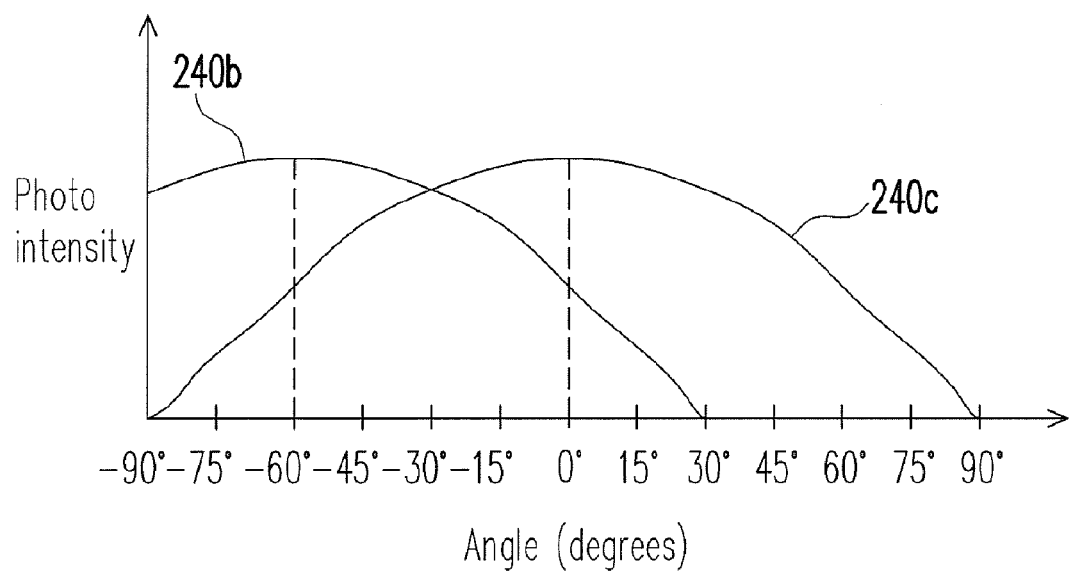
FIG. 7B shows sensing spectrums of the light source sensed by two first photo sensors adjacent to the first photo sensor shown in FIG. 7A.

FIG. 7A shows a sensing spectrum of the light source sensed by one of the first photo sensors that senses the maximum photo intensity, and FIG. 7B shows sensing spectrums of the light source sensed by two first photo sensors adjacent to the first photo sensor shown in FIG. 7A, in which the transverse axis is defined as the angle of the light source relative to the reference plane, and the longitudinal axis is defined as the relative photo intensity of the light source sensed by the photo sensors. In addition, FIG. 7C shows a sensing spectrum obtained from the sensing curves shown in FIG. 7B after performing a normalization on a difference of photo intensities, in which the transverse axis is defined as the angle of the light source relative to the reference plane, and the longitudinal axis is defined as the relative value after normalization.

Referring to FIG. 7A, in this embodiment, for example, the light source 101 is disposed along the first direction L1 and at an angle θ of −30 degrees relative to the reference plane 230. Therefore, the first photo sensor 210 with the first sensing surface 210a facing this direction senses the maximum photo intensity, and the sensing spectrum of the light source 101 at different angles is formed into a sensing curve 240a as shown in FIG. 7A.

Then, in order to enable the light source detection device 300 to sense the direction of the light source 101 more accurately, the photo intensities of the light source sensed by two first photo sensors 210 adjacent to the above first photo sensor 210 are respectively utilized as a mechanism for correcting the light source direction. The sensing surfaces 210a of the two first photo sensors 210 face, for example, −60 degrees and 0 degrees along the first direction L1. Therefore, the photo intensities of the light source sensed by the two first photo sensors 210 are as shown by curves 240b and 240c of FIG. 7B, and when the light source is located at −60 degrees or 0 degrees, the maximum photo intensity may be sensed.

Figure 7C:
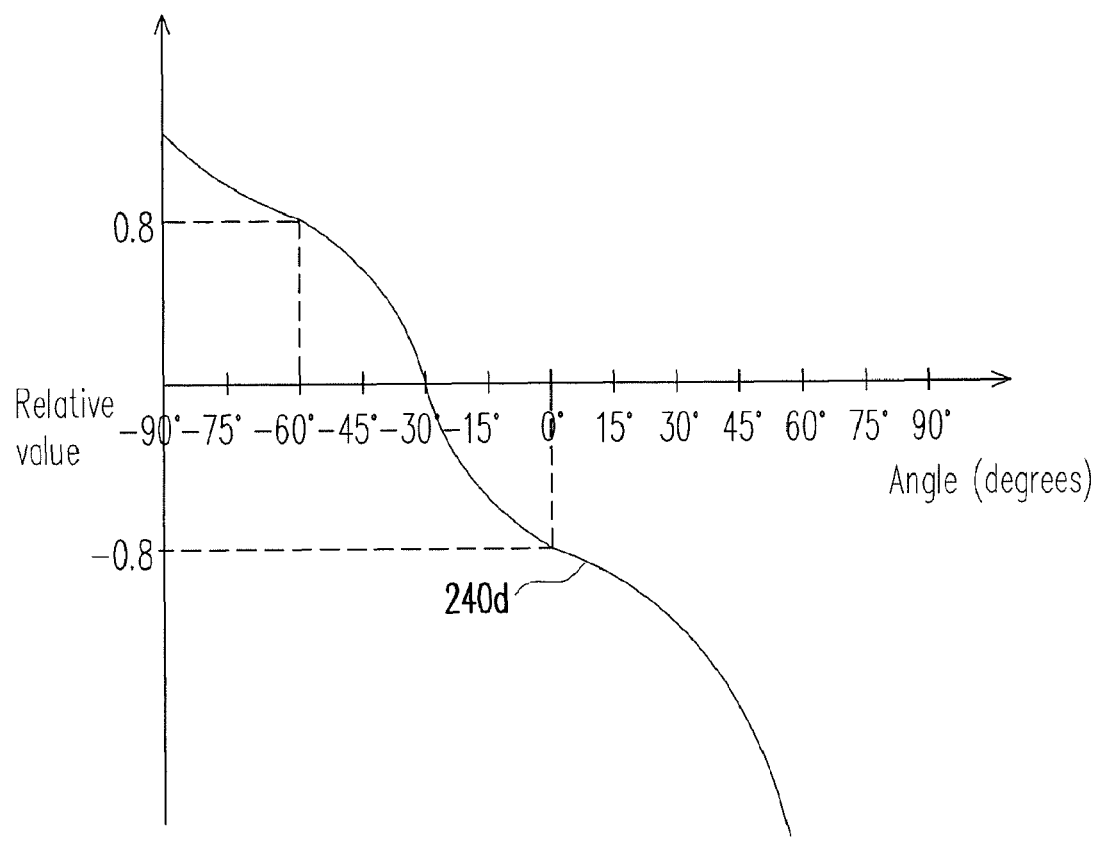
FIG. 7C shows a sensing spectrum obtained from the sensing curves shown in FIG. 7B after performing a normalization on a difference of photo intensities.

Likewise, the photo intensity of the light source sensed by one of the first photo sensors 210 is subtracted from the photo intensity of the light source sensed by the other one, so as to obtain a difference of the photo intensities, and then the difference is divided by the photo intensity sensed by the first photo sensor that senses the maximum photo intensity, thereby obtaining a curve 240d as shown in FIG. 7C and data in Table 4. In the curve 240d, the range between two maximum photo intensities of the two first photo sensors is taken as the range for effectively detecting the angle of the light source, for example, in the range between −60 degrees and 0 degrees, in which a single angle is corresponding to a single normalized difference of the photo intensities. Therefore, if the position of the light source 101 falls in the range of −60 degrees to 0 degrees, the normalization of the difference of photo intensities may be performed on the photo intensities sensed by the above two first photo sensors 210 and the photo intensity sensed by the first photo sensor 210 that senses the maximum photo intensity, thereby correcting the angle of the light source 101 relative to the reference plane 230 together with the data in Table 4.

TABLE 4

| Normalized Difference of Photo Intensities | Angle of Light Source Relative to Reference Plane |
|---|---|
| 0.8 | −60 |
| 0.7 | −55 |
| 0.5 | −50 |
| 0.1 | −45 |
| 0 | −30 |
| −0.1 | −15 |
| −0.5 | −10 |
| −0.7 | −5 |
| −0.8 | 0 |

In another embodiment, the angle of the light source 101 relative to the reference plane 230 may also be corrected or converted by using two first photo sensors 210 at two sides of the first photo sensor 210 that senses the maximum photo intensity. The sensing surfaces of the two first photo sensors 210 may face, for example, −90 degrees and +30 degrees, which will be described in detail below.

Figure 7D:
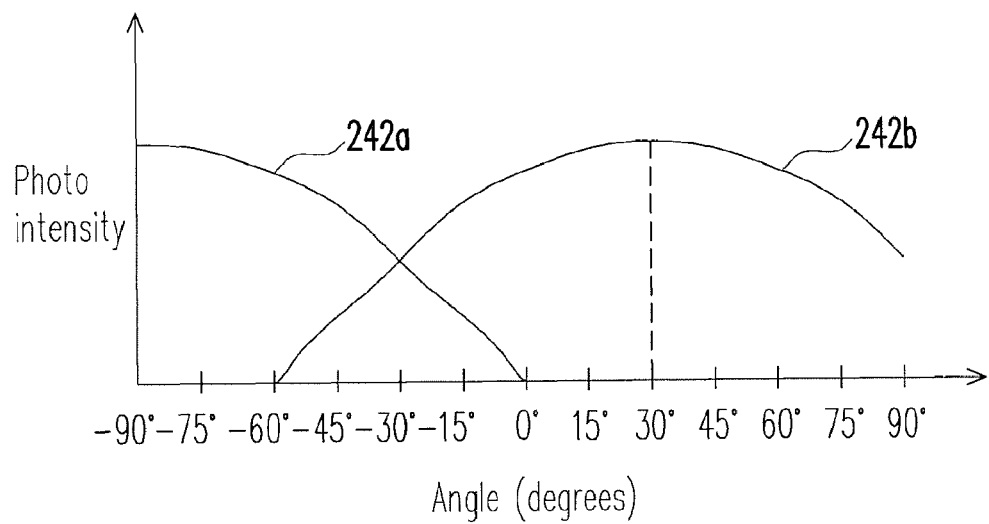
FIG. 7D shows sensing spectrums of a light source sensed by two first photo sensors at two sides of the first sensor as shown in FIG. 7A.

FIG. 7D shows sensing spectrums of the light source sensed by two first photo sensors at two sides of the first sensor as shown in FIG. 7A, in which the transverse axis is defined as the angle of the light source relative to the reference plane, and the longitudinal axis is defined as the relative photo intensity of the light source sensed by the photo sensors. In addition, FIG. 7E shows a sensing spectrum obtained from the sensing curves shown in FIG. 7D after performing a normalization on a difference of photo intensities, in which the transverse axis is defined as the angle of the light source relative to the reference plane, and the longitudinal axis is defined as the relative value after normalization.

The two first photo sensors 210 are respectively disposed to face the directions of −90 degrees and +30 degrees, and thus the sensing spectrums of the light source sensed by the two first photo sensors 210 are as shown by curves 242a and 242b of FIG. 7D. In this embodiment, the angle range where both the two first photo sensors can simultaneously sense the photo intensity of the light source is taken as the range capable of effectively detecting the angle of the light source, for example, in the range between −60 degrees and 0 degrees, as shown in FIG. 7D.

Figure 7E:
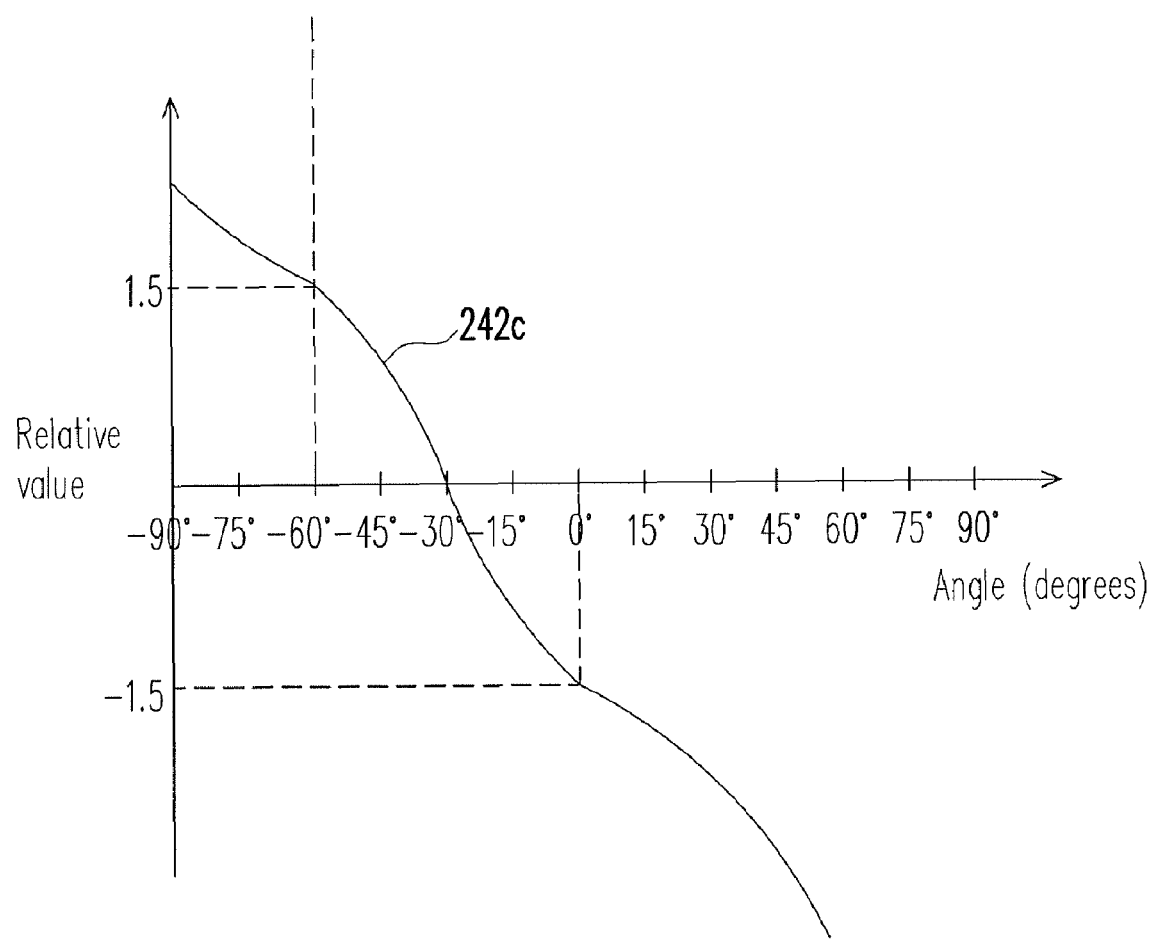
FIG. 7E shows a sensing spectrum obtained from the sensing curves shown in FIG. 7D after performing a normalization on a difference of photo intensities.

Likewise, the photo intensity of the light source sensed by one of the first photo sensors 210 is subtracted from the photo intensity of the light source sensed by the other one, so as to obtain a difference of the photo intensities, and then the difference is divided by the photo intensity sensed by the first photo sensor that senses the maximum photo intensity, thereby obtaining a curve 242c as shown in FIG. 7E and data in Table 5. In the curve 242c, the angle range where both the two first photo sensors can simultaneously sense the photo intensity of the light source is taken as the range capable of effectively detecting the angle of the light source, for example, in the range between −60 degrees and 0 degrees, in which a single angle is corresponding to a single normalized difference of the photo intensities. Therefore, if the position of the light source 101 is in the range of −60 degrees to 0 degrees, the normalization of the difference of photo intensities may be performed on the photo intensities sensed by the two first photo sensors 210 and the photo intensity sensed by the first photo sensor 210 that senses the maximum photo intensity, thereby correcting the angle of the light source 101 relative to the reference plane 230 together with the data in Table 5.

TABLE 5

| Normalized Difference of Photo Intensities | Angle of Light Source Relative to Reference Plane |
|---|---|
| 1.5 | −60 |
| 1.3 | −55 |
| 1.0 | −50 |
| 0.5 | −45 |
| 0 | −30 |
| −0.5 | −15 |
| −1.0 | −10 |
| −1.3 | −5 |
| −1.5 | 0 |

In another embodiment, the normalization process may also include obtaining the difference of the photo intensities through subtracting the photo intensity of the light source sensed by one of the two first photo sensors 210 from the photo intensity of the light source sensed by the other one, and then dividing the difference by a sum of the photo intensities of the light source sensed by the two first photo sensors 210, and the related descriptions are obtained with reference to the above embodiments and will not be repeated herein. In such a manner, data in Table 6 may be obtained.

TABLE 6

| Normalized Difference of Photo Intensities | Angle of Light Source Relative to Reference Plane |
|---|---|
| 1.0 | −60 |
| 0.9 | −55 |
| 0.7 | −50 |
| 0.5 | −45 |
| 0 | −30 |
| −0.5 | −15 |
| −0.7 | −10 |
| −0.9 | −5 |
| −1.0 | 0 |

Accordingly, different correction accuracies may be obtained by adopting different manners for normalizing the photo intensities and selecting different two first photo sensors at two sides of the first photo sensor that senses the maximum photo intensity, as shown in Tables 4, 5, and 6. In other words, the above description only intends to illustrate the present invention, instead of limiting the present invention, that is, the light source detection device of this embodiment may adopt the above manners for normalizing the photo intensities depending upon the requirements and design of the users.

Likewise, the detection of the angle of the light source 101 moving along the first direction L1 is taken as an example, that is, only the moving direction of the light source in one dimension is detected. In other words, in order to enable the light source detection device 300 to detect the moving direction or angle of the light source in another dimension, the light source detection device 300 may be further provided with a plurality of second photo sensors (not shown). The second photo sensors are disposed in an array on a reference plane along a second direction (not shown). The second photo sensors may employ, for example, the above first photo sensors, and related descriptions may be obtained with reference to the above embodiment and will not be repeated herein. In addition, the second direction L2 is, for example, perpendicular to the first direction L1. In such a manner, the second photo sensors may sense the moving angle of the light source relative to the reference plane along the second direction, such that the light source detection device 230 can simultaneously detect the moving direction or position of the light source 101 in two dimensions, and the related detection mechanism thereof is similar to that described in the above embodiment and thus will not be repeated herein.

In view of the above, in the light source detection device 300, the plurality of first photo sensors 210 is disposed on the reference plane 230, and the included angles (for example, an angle θ as shown in FIG. 6A) between the normal vectors 210c of any two adjacent first sensing surfaces 210a are equal, and the direction or angle where the first photo sensor 210 that senses the maximum photo intensity faces is defined as the direction or angle of the light source 101 relative to the reference plane 230. Then, the above normalization of photo intensities is performed on the photo intensities sensed by the two first sensors 210 adjacent to the first photo sensor 210 that senses the maximum photo intensity, so as to correct the direction or angle of the light source 101 relative to the reference plane 230. Different accuracies may be obtained according to different normalization conditions, as shown in Tables 4, 5, and 6. In other words, the light source detection device of this embodiment does not need to control the rotation direction of the reference plane to detect the light source, but directly calculates the normalized difference of the photo intensities according to the photo intensities of the light source sensed by the first photo sensors 210, thereby obtaining the direction or angle of the light source 101 together with the data in Table 4, 5, or 6.

Figure 8:
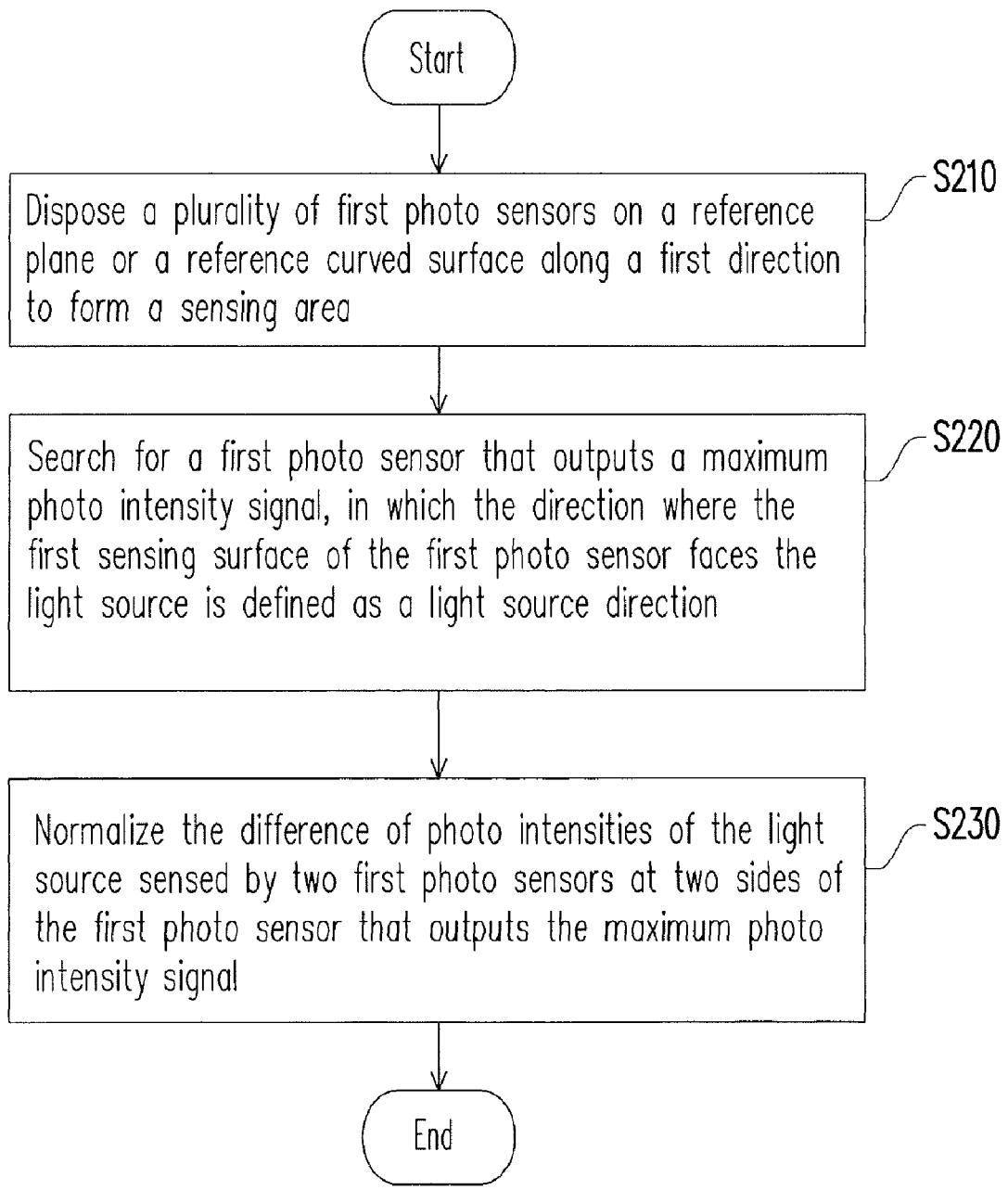
FIG. 8 is a flow chart block diagram of a method for detecting a light source according to an embodiment of the present invention.

In addition, FIG. 8 is a flow chart block diagram of a method for detecting a light source according to an embodiment of the present invention. Referring to FIG. 8, this embodiment is suitable for detecting a position of a light source in an open space.

First, in Step S210, a plurality of first photo sensors is disposed on a reference plane along a first direction to form a sensing area, in which the sensing area is defined as the range of a difference of photo intensities of the light source simultaneously sensed by the first photo sensors after normalization. Each of the first photo sensors has a first sensing surface for detecting a photo intensity of the light source and is adapted to output a photo intensity signal. Included angles between normal vectors of any two adjacent first sensing surfaces are equal, the normal vectors are coplanar, and related descriptions may be obtained with reference to the illustrations of the light source detection device 300, which will not be repeated herein.

Thereafter, in Step S220, it searches for a first photo sensor that outputs a maximum photo intensity signal, in which the direction where the first sensing surface of the first photo sensor faces the light source is defined as a light source direction, and related description may be obtained with reference to the illustrations of the light source detection device 300, which will not be repeated herein.

Furthermore, in Step S230, the difference of photo intensities of the light source sensed by two first photo sensors at two sides of the first photo sensor that outputs the maximum photo intensity signal is normalized, so as to correct the light source direction. In particular, the above normalization may be performed by dividing the difference of the photo intensities of the light source sensed by the first photo sensors by the sum of the photo intensities of the light source sensed by the first photo sensors to form a sensing area, thereby directly correcting the light source direction; or performed by dividing the difference of the photo intensities of the light source sensed by the first photo sensors by the photo intensity of the light source sensed by the first photo sensor that outputs the maximum photo intensity signal to form a sensing area, thereby directly correcting the light source direction. More detailed description may be obtained with reference to the illustrations of the light source detection device 300, which will not be repeated herein. Herein, a method for detecting a light source is achieved, and the method is applicable to the above light source detection device 300.

[Third Embodiment]

Figure 9A:
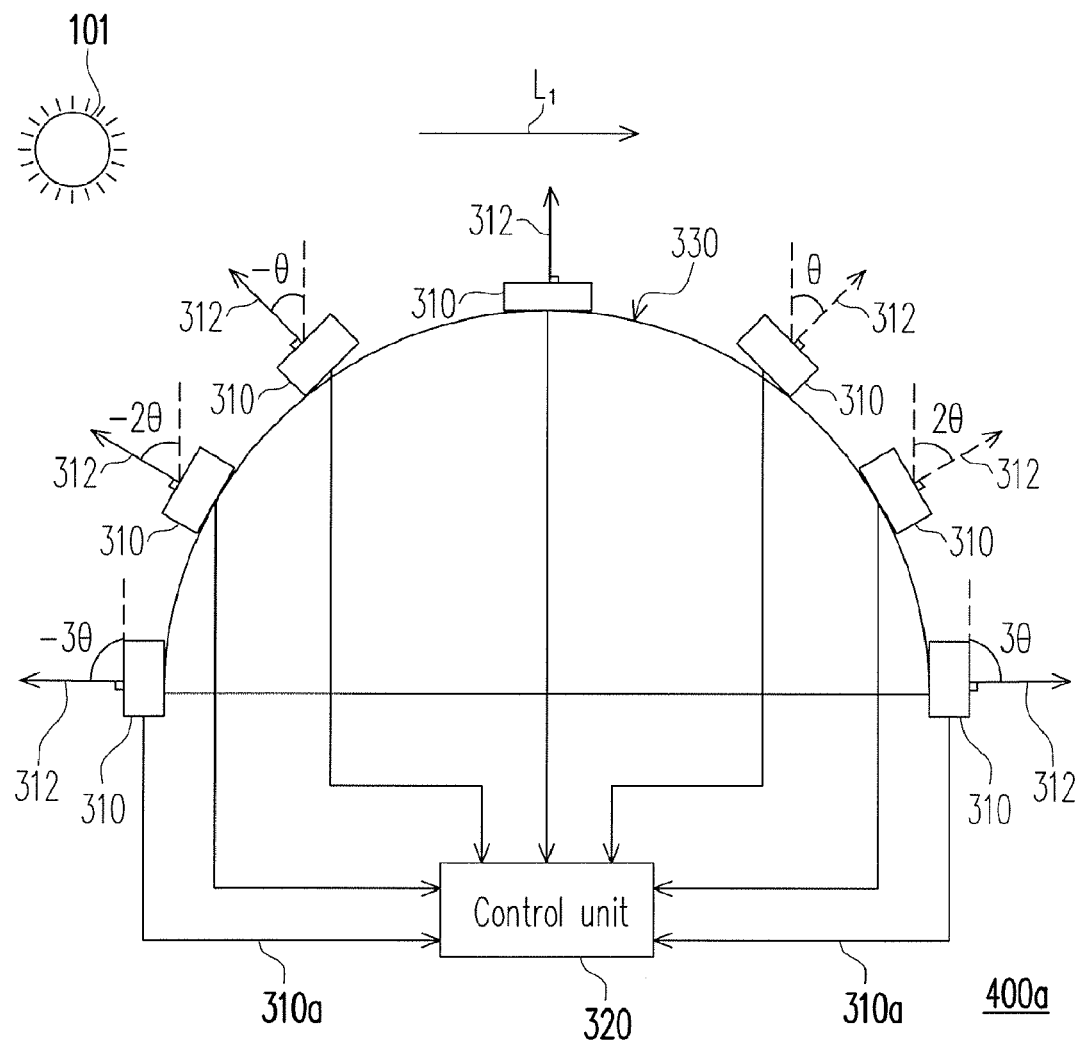
FIGS. 9A-9C are schematic views of a light source detection device in different implementations according to a third embodiment of the present invention.
Figure 9B:
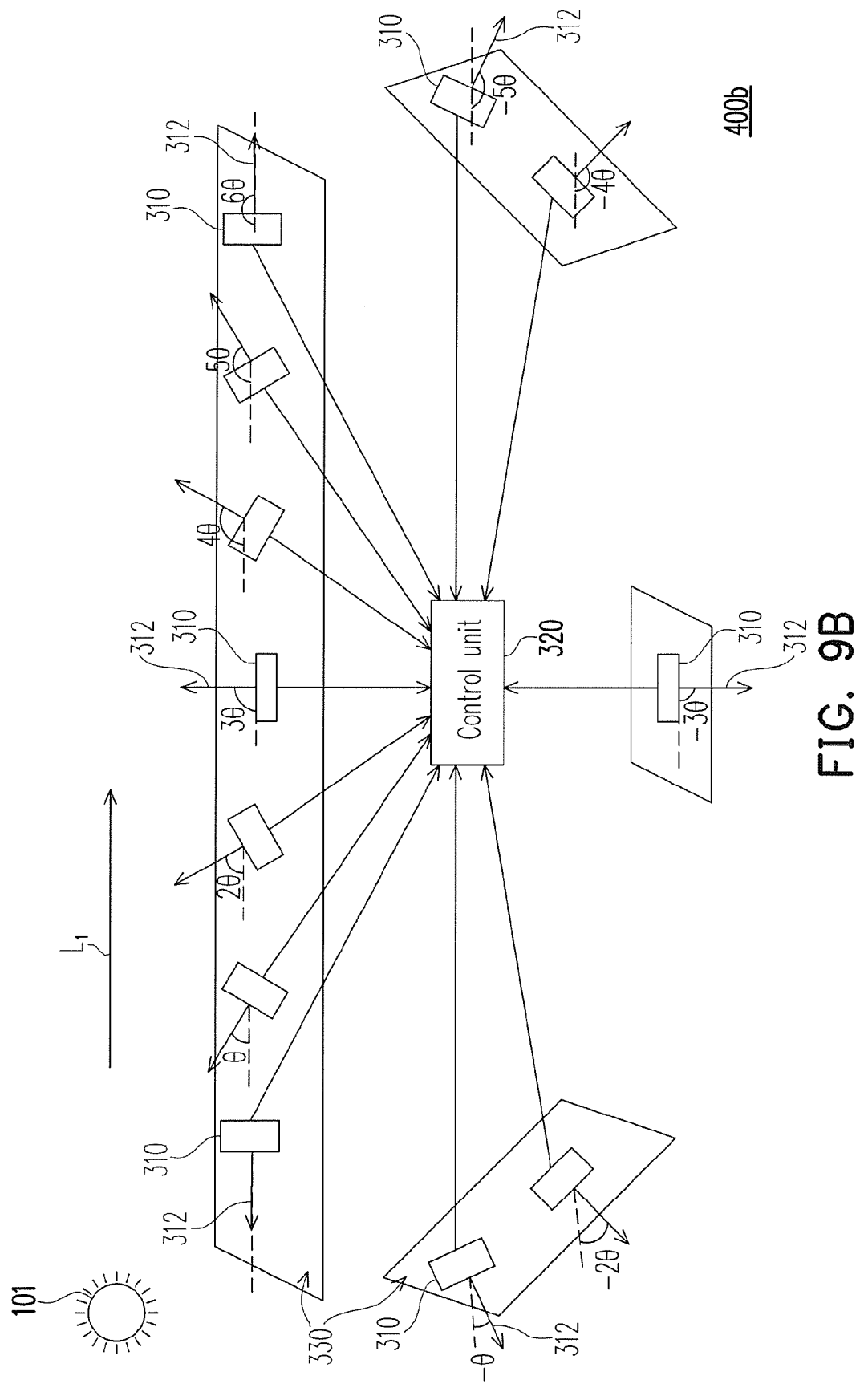
Figure 9C:
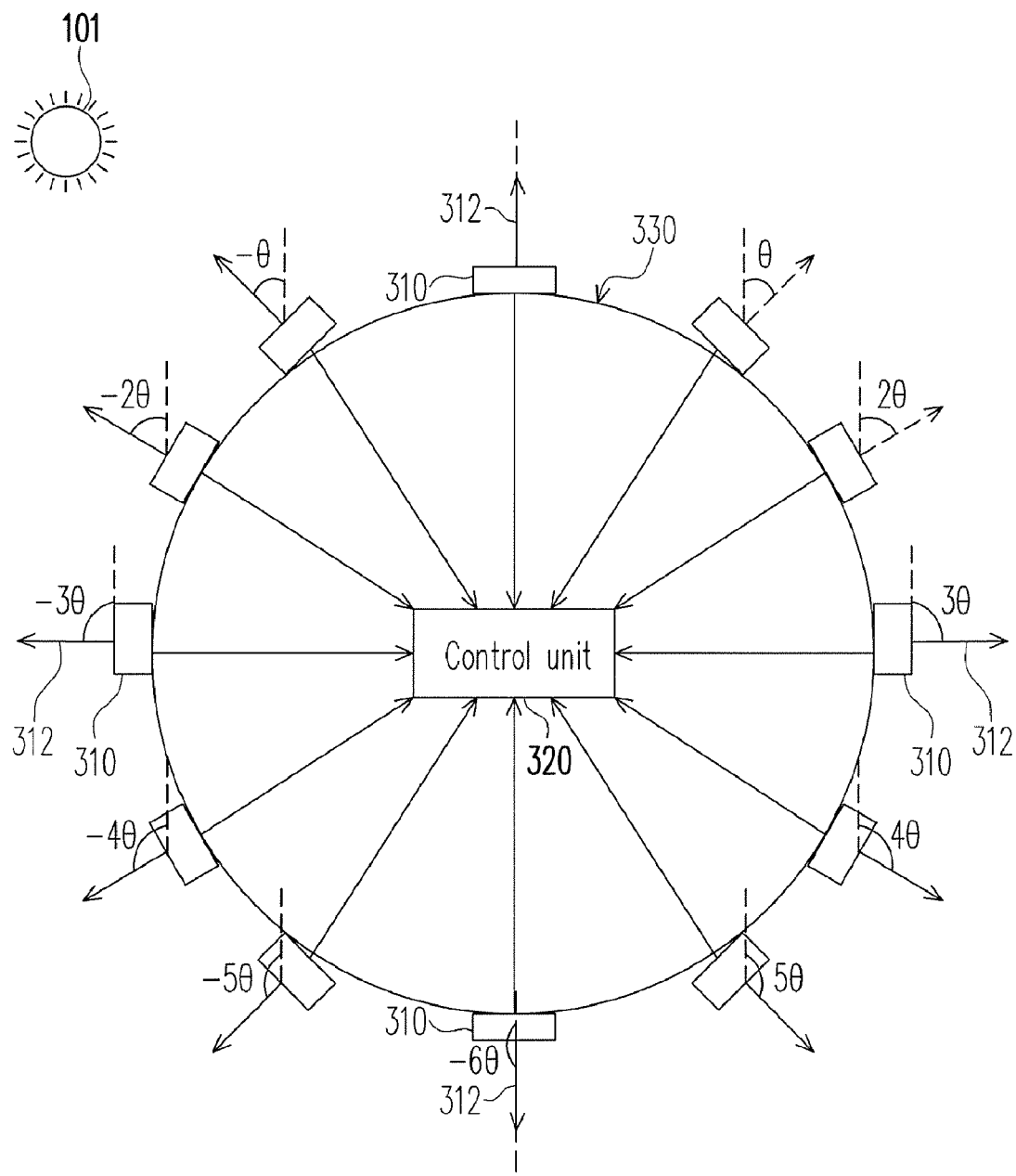

FIGS. 9A-9C are schematic views of a light source detection device in different implementations according to a third embodiment of the present invention. Referring to FIGS. 9A to 9C, a light source detection device 400a, 400b, 400c of this embodiment includes a first photo sensor 310 and a control unit 320. The first photo sensors 310 are disposed in an array on a reference curved surface 330 along a first direction L1. In this embodiment, the first photo sensor 310 employs, for example, the above first photo sensors 210, and related descriptions will not be repeated herein. In addition, included angles between normal vectors 312 of any two adjacent first photo sensors 310 are equal, for example, an angle θ as shown in FIGS. 9A to 9C, and the normal vectors 312 are coplanar.

Likewise, the control unit 320 is adapted to receive the photo intensity signals 310a sensed by the first photo sensors

310, and normalize the difference of the photo intensities of the light source 101 sensed by the first photo sensors 310, so as to directly detect the angle of the light source 101 relative to the reference curved surface 330 along the first direction L1. In this embodiment, the control unit 320 employs, for example, the above control unit 220, and related descriptions may be obtained with reference to the illustrations of the above embodiment, which will not be repeated herein.

In this embodiment, the light source detection device 400*a*, 400*b*, 400*c* employs the concept adopted by the above light source detection device 300 for detecting the light source 101, only except that the first photo sensors 310 are disposed on the reference curved surface 330. The reference curved surface 330 is, for example, a semi-circle arc, a combination of a plane and a semi-circle arc, or a full circle, as shown in FIGS. 9A to 9C. In such a manner, the angle of the light source detection device 400*a*, 400*b*, 400*c* for detecting the light source may have a diversified range, for example, from 0 degrees to 360 degrees, or from 0 degrees to 180 degrees, and the actuation mechanism for detecting the light source 101 in this embodiment may be obtained with reference to the illustration of the above embodiment, which will not be repeated herein.

It should be noted that, the reference curved surface 330 shown in FIGS. 9A to 9C is only used for demonstration, instead of limiting the present invention, and other suitable designs are also available.

To sum up, the light source detection device of the present invention at least has the following advantages. First, two first photo sensors are properly disposed on a reference plane, and a normalization operation is performed on the difference of the photo intensities of the light source sensed by the first photo sensors. Therefore, when detecting the light source, the position of the light source may be obtained directly through the photo intensities of the light source sensed by the first photo sensors. In addition, the light source detection device may be properly disposed with a plurality of first photo sensors on a reference plane or a reference curved surface. Then, the direction where the first photo sensor that senses the maximum photo intensity faces is defined as the light source direction, and the normalization operation is performed according to the photo intensities sensed by the two first photo sensors adjacent to the first photo sensor that senses the maximum photo intensity, thereby correcting the light source direction. Moreover, the present invention further provides a method for detecting a light source, which is applicable to the above light source detection device. Therefore, the light source detection device of the present invention is adapted to be disposed in an open space for detecting the position of the light source, which has a simple and accurate light source detection mechanism.

It will be apparent to those skilled in the art that various modifications and variations can be made to the structure of the present invention without departing from the range or spirit of the invention. In view of the foregoing, it is intended that the present invention cover modifications and variations of this invention provided they fall within the range of the following claims and their equivalents.

What is claimed is:

1. A light source direction detection device, adapted to be disposed in an open space to detect a position of a light source, comprising:

two first photo sensors, disposed on a reference plane along a first direction, wherein each of the first photo sensors comprises a first sensing surface for detecting a photo intensity of the light source and is adapted to output a photo intensity signal, the first sensing surfaces are disposed back to back or face to face, an included angle between a normal vector of one of the first sensing surfaces and a normal vector of the reference plane is equal to an included angle between a normal vector of the other one of the first sensing surfaces and the normal vector of the reference plane, and the normal vectors are coplanar;

a control unit, adapted to receive the photo intensity signals, and normalize a difference of photo intensities of the light source sensed by the first photo sensors, so as to detect an angle of the light source relative to the reference plane along the first direction; and an intermediate photo sensor disposed between the first photo sensors, wherein the intermediate photo sensor comprises an intermediate sensing surface for detecting the photo intensity of the light source and is adapted to output an intermediate photo intensity signal, and a normal vector of the intermediate sensing surface is in the same direction as the normal vector of the reference plane, wherein the control unit is further configured to divide the difference of the photo intensities of the light source sensed by the first photo sensors by the photo intensity of the light source sensed by the intermediate photo sensor to normalize the difference of the photo intensities of the light source sensed by the first photo sensors.

2. The light source detection device according to claim 1, wherein an angle range of the photo intensity of the light source sensed by each of the first sensing surfaces along the first direction is between 0 degrees and 180 degrees.

3. The light source detection device according to claim 1, wherein the included angle between the normal vector of one of the first sensing surfaces and the normal vector of the reference plane is larger than 0 degrees and smaller than 90 degrees.

4. The light source detection device according to claim 1, wherein the control unit comprises:

a signal converting unit, adapted to convert the photo intensity signals of the first photo sensors into digital signals;

a storage unit, adapted to store the digital signals of the photo intensity signals, and data amount of the difference of the photo intensities of the light source sensed by the first photo sensors after normalization; and a micro control unit, adapted to normalize the difference of the photo intensity signals, so as to detect an angle of the light source relative to the reference plane along the first direction.

5. The light source detection device according to claim 4, wherein the control unit further comprises a motor control unit, adapted to control the reference plane to rotate along the first direction.

6. The light source detection device according to claim 1, further comprising two second photo sensors, disposed on a reference plane along a second direction, wherein each of the second photo sensors comprises a second sensing surface for detecting the photo intensity of the light source and is adapted to output a photo intensity signal, the second sensing surfaces are disposed back to back or face to face, an included angle between a normal vector of one of the second sensing surfaces and the normal vector of the reference plane is equal to an included angle between a normal vector of the other one of the second sensing surfaces and the normal vector of the reference plane, and the normal vectors are coplanar.

7. The light source detection device according to claim 6, wherein the first direction is perpendicular to the second direction.

8. The light source detection device according to claim 6, wherein an angle range of the photo intensity of the light source sensed by each of the second sensing surfaces along the second direction is between 0 degrees and 180 degrees.

9. The light source detection device according to claim 8, wherein the included angle between the normal vector of one of the second sensing surfaces and the normal vector of the reference plane is larger than 0 degrees and smaller than 90 degrees.

10. A method for detecting a light source direction, suitable for detecting a position of a light source in an open space, comprising:

disposing two first photo sensors on a reference plane along a first direction to form a sensing area, wherein the sensing area is defined as a range of a difference of photo intensities of the light source simultaneously sensed by the first photo sensors after normalization, each of the first photo sensors comprises a first sensing surface for detecting a photo intensity of the light source and is adapted to output a photo intensity signal, the first sensing surfaces are disposed back to back or face to face, an included angle between a normal vector of one of the first sensing surfaces and a normal vector of the reference plane is equal to an included angle between a normal vector of the other one of the first sensing surfaces and the normal vector of the reference plane, and the normal vectors are coplanar;

normalizing a difference of the photo intensities of the light source sensed by the first photo sensors;

determining whether the normalized difference of the photo intensities fall within the sensing area or not, so as to directly detect an angle of the light source relative to the reference plane along the first direction; and disposing an intermediate photo sensor between the first photo sensors, wherein the intermediate photo sensor comprises an intermediate sensing surface for detecting a photo intensity of the light source and is adapted to output an intermediate photo intensity signal, and a normal vector of the intermediate sensing surface is in the same direction as the normal vector of the reference plane, wherein the process of normalizing the difference of the photo intensities of the light source sensed by the first photo sensors further comprises:

dividing the difference of the photo intensities of the light source sensed by the first photo sensors by the photo intensity of the light source sensed by the intermediate photo sensor.

11. The method according to claim 10, wherein the process of normalizing the difference of the photo intensities of the light source sensed by the first photo sensors further comprises:

dividing the difference of the photo intensities of the light source sensed by the first photo sensors by a sum of the photo intensities of the light source sensed by the first photo sensors.

12. The method according to claim 10, wherein when the normalized difference of the photo intensities exceeds the sensing area, the method further comprises:

rotating the reference plane clockwise or anticlockwise along the first direction till the normalized difference of the photo intensities sensed by the photo sensors falls within the sensing area.

* * * * *